No. 885,639. PATENTED APR. 21, 1908.
J. W. NUNAMAKER.
VOTING MACHINE.
APPLICATION FILED JUNE 15, 1903.

16 SHEETS—SHEET 1.

Witnesses.
Edward T. Wray.
Fred G. Fischer

Inventor.
John W. Nunamaker
by Burton & Burton
his Atty's.

No. 885,639. PATENTED APR. 21, 1908.
J. W. NUNAMAKER.
VOTING MACHINE.
APPLICATION FILED JUNE 15, 1903.

16 SHEETS—SHEET 6.

Witnesses.
Edward T. Wray.
Fred G. Fischer.

Inventor.
John W. Nunamaker
by Burton & Burton
his Attys.

THE NORRIS PETERS CO., WASHINGTON, D. C.

No. 885,639. PATENTED APR. 21, 1908.
J. W. NUNAMAKER.
VOTING MACHINE.
APPLICATION FILED JUNE 15, 1903.
16 SHEETS—SHEET 7.
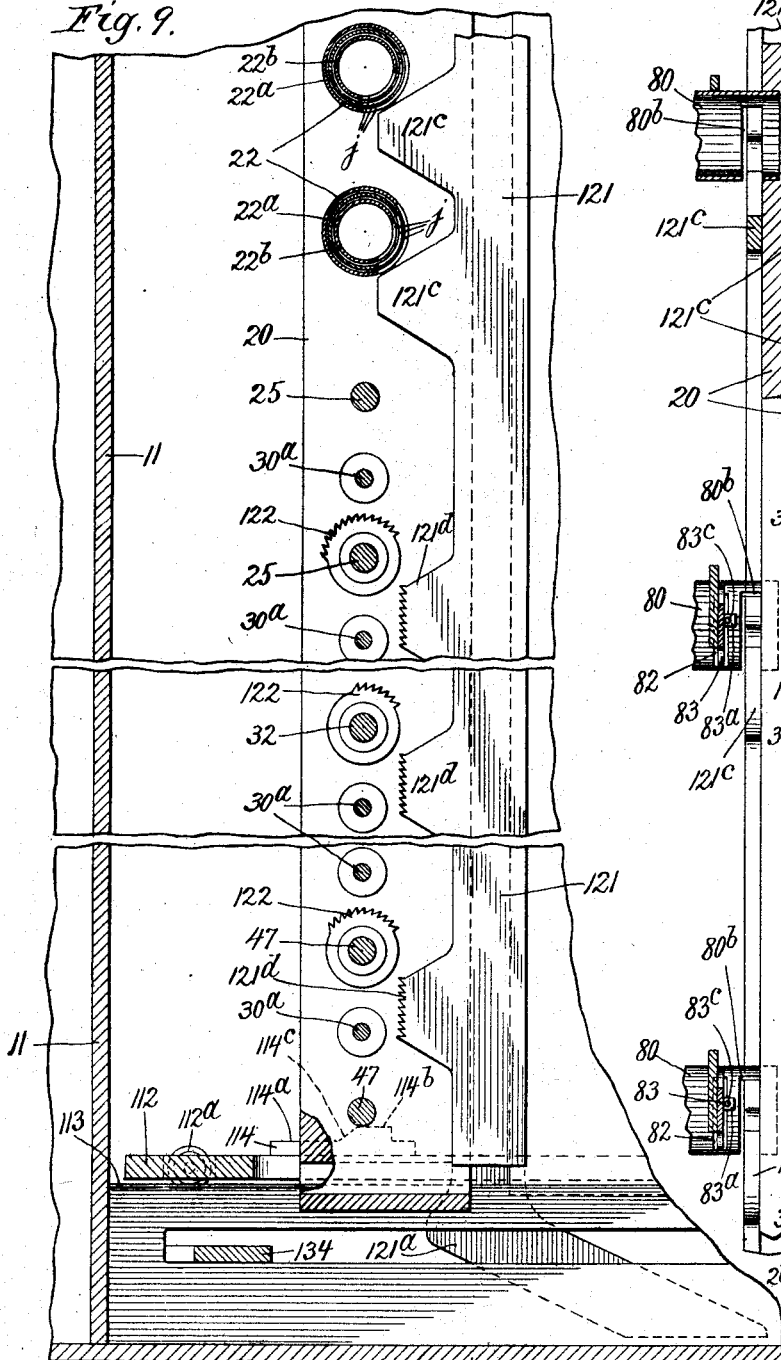
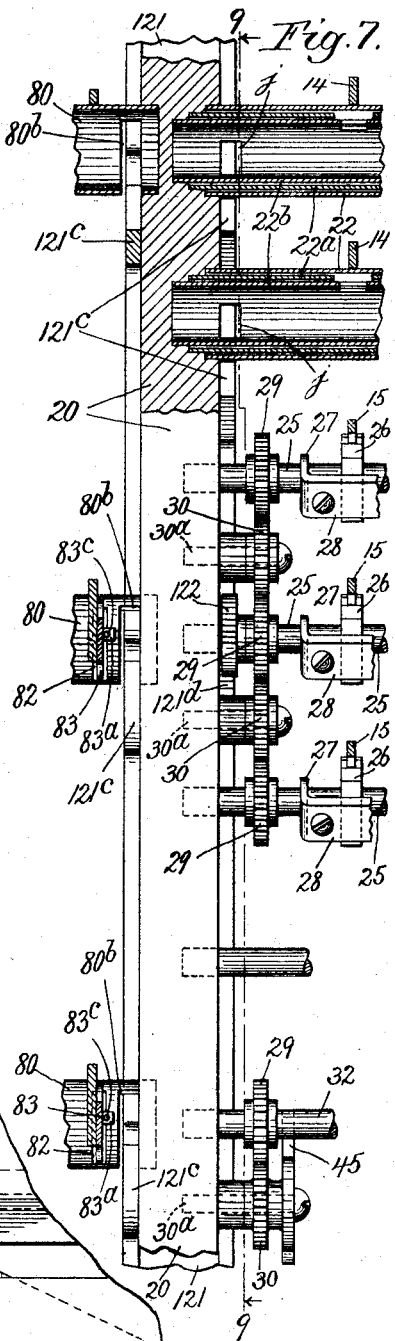

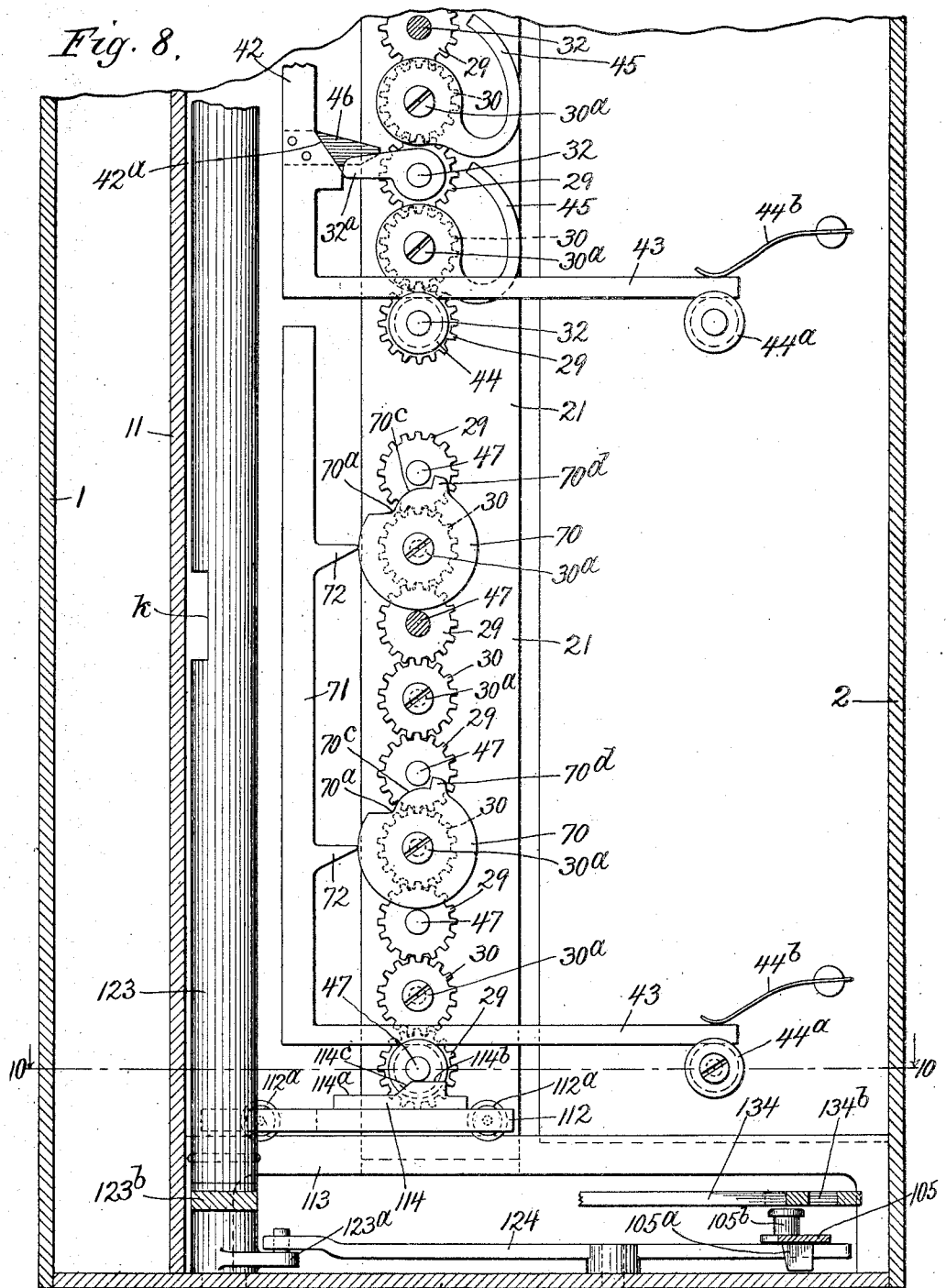

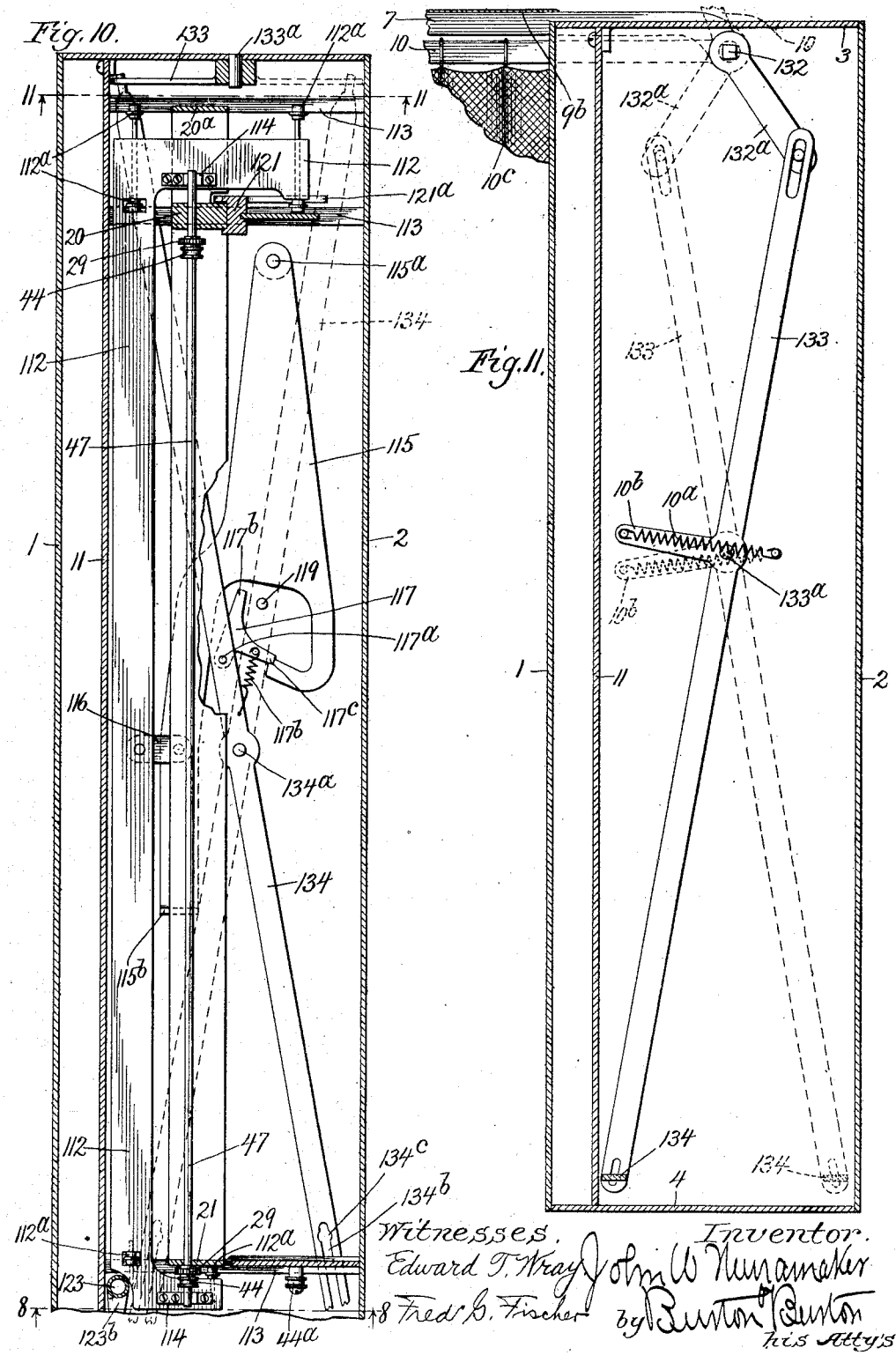

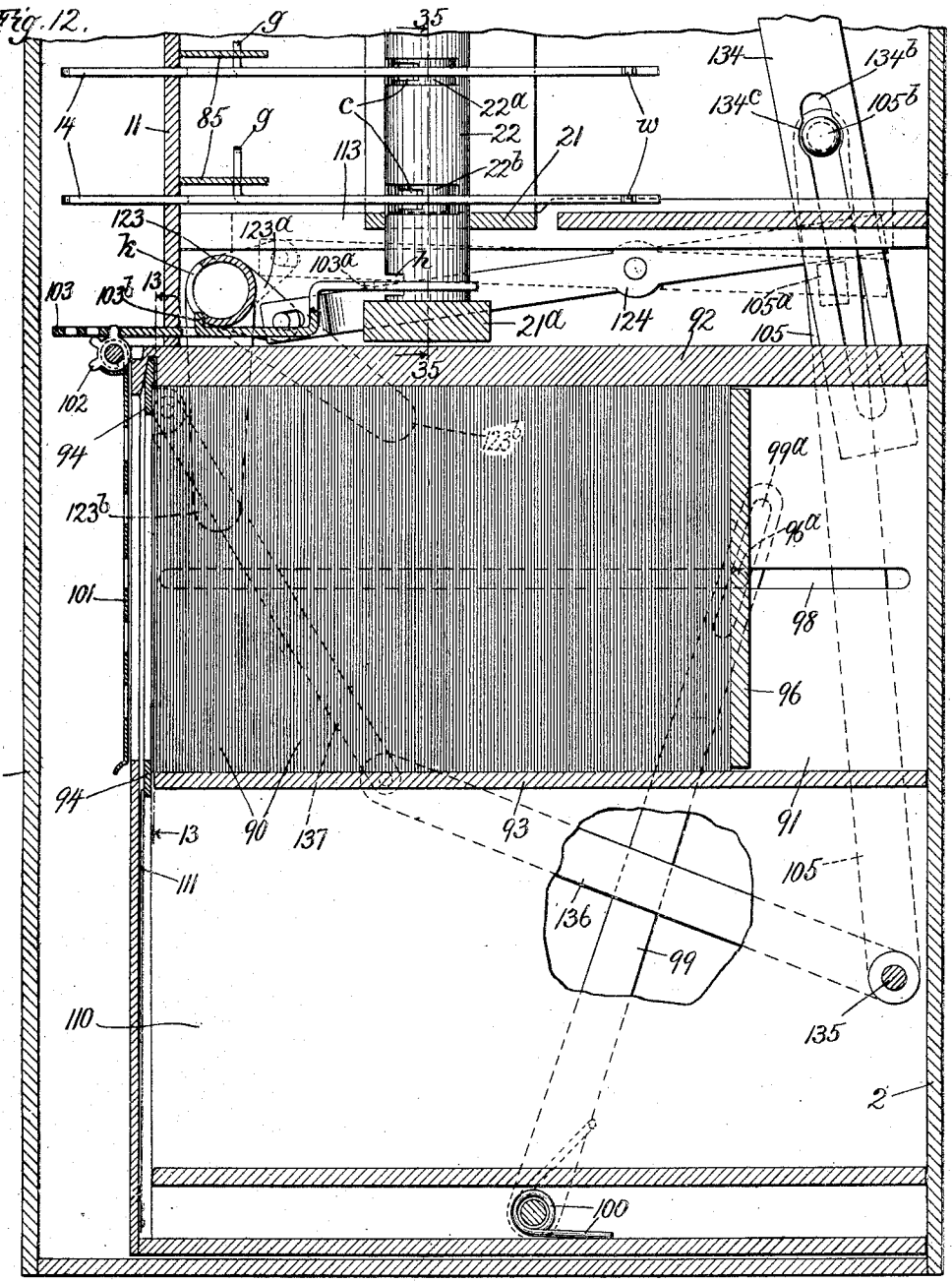

No. 885,639. PATENTED APR. 21, 1908.
J. W. NUNAMAKER.
VOTING MACHINE.
APPLICATION FILED JUNE 15, 1903.

16 SHEETS—SHEET 11.

Witnesses.
Edward T. Wray.
Fred G. Fischer

Inventor.
John W Nunamaker
by Burton & Burton
his Attys.

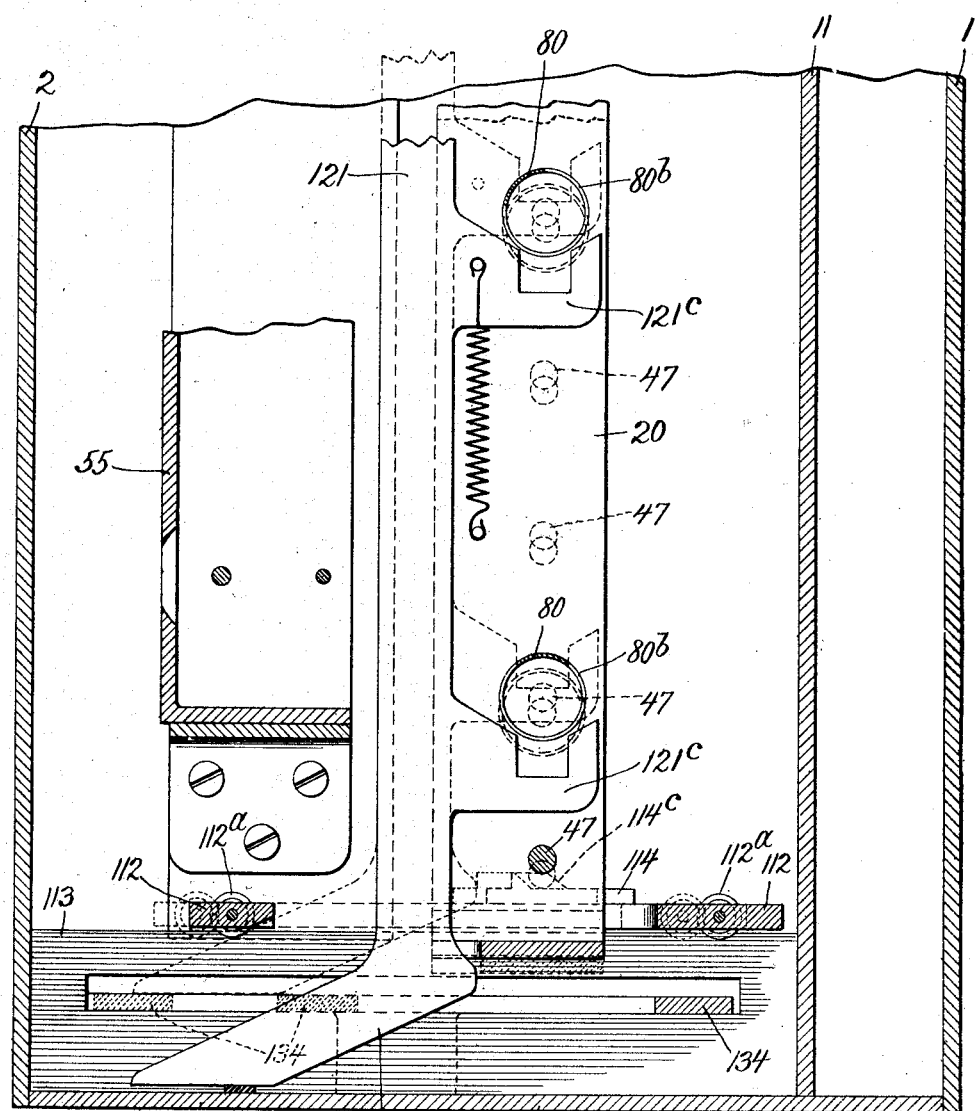

No. 885,639. PATENTED APR. 21, 1908.
J. W. NUNAMAKER.
VOTING MACHINE.
APPLICATION FILED JUNE 15, 1903.

16 SHEETS—SHEET 13.

Witnesses.
Edward T. Wray.
Fred G. Fischer.

Inventor
John W. Nunamaker
by Burton & Burton his Attys.

No. 885,639. PATENTED APR. 21, 1908.
J. W. NUNAMAKER.
VOTING MACHINE.
APPLICATION FILED JUNE 15, 1903.
16 SHEETS—SHEET 14.
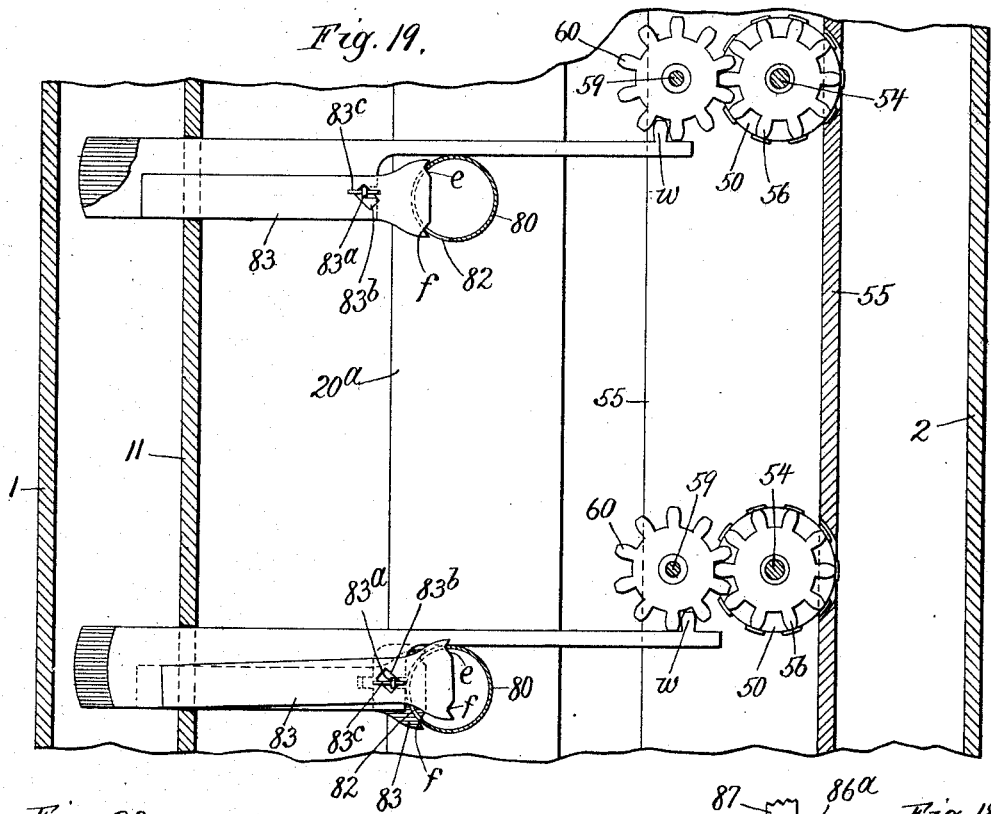
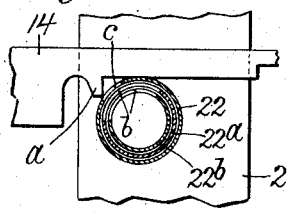
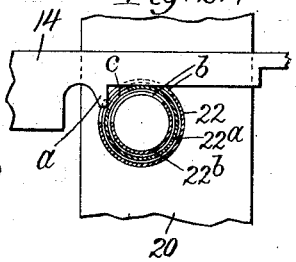
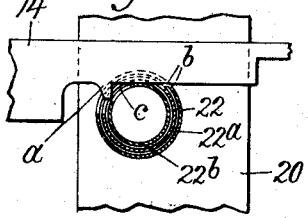
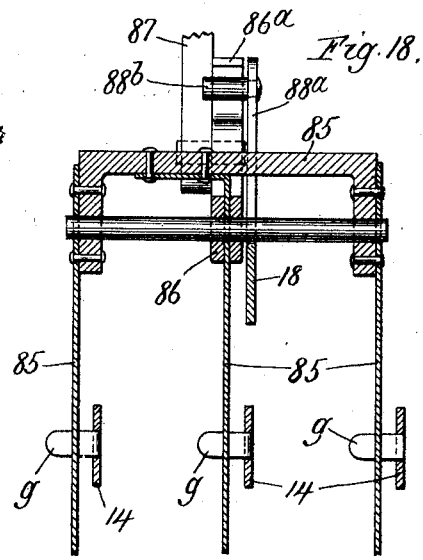
Witnesses
Edward T. Wray
Fred G. Fischer
Inventor
John W. Nunamaker
by Burton & Burton
his Atty's
THE NORRIS PETERS CO., WASHINGTON, D. C.

No. 885,639. PATENTED APR. 21, 1908.
J. W. NUNAMAKER.
VOTING MACHINE.
APPLICATION FILED JUNE 15, 1903.
16 SHEETS—SHEET 15.
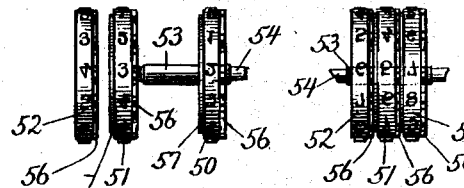
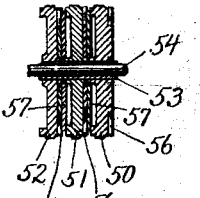
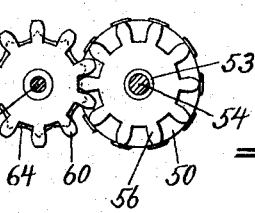
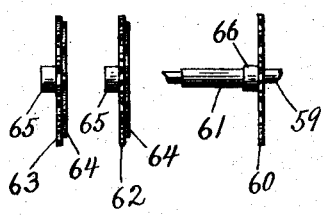
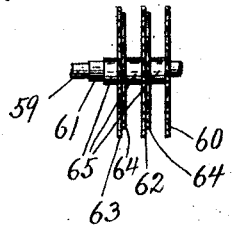
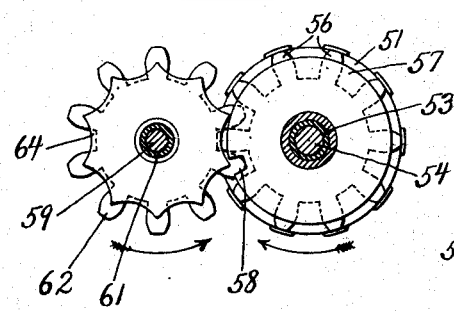
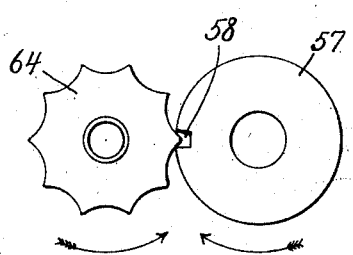
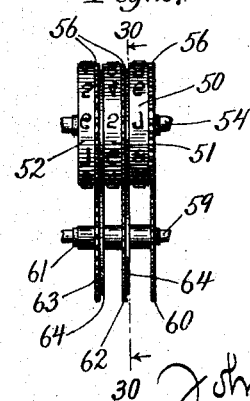

No. 885,639.

PATENTED APR. 21, 1908.

J. W. NUNAMAKER.
VOTING MACHINE.
APPLICATION FILED JUNE 15, 1903.

16 SHEETS—SHEET 16.

Witnesses.
Edward F. Wray.
Fred G. Fischer

Inventor.
John W. Nunamaker
by Burton & Burton
his Atty's.

UNITED STATES PATENT OFFICE.

JOHN W. NUNAMAKER, OF CHICAGO, ILLINOIS, ASSIGNOR, BY MESNE ASSIGNMENTS, TO ADOLPH J. BORGMEIER, OF CHICAGO, ILLINOIS.

VOTING-MACHINE.

No. 885,639.   Specification of Letters Patent.   Patented April 21, 1908.

Application filed June 15, 1903. Serial No. 161,544.

*To all whom it may concern:*

Be it known that I, JOHN W. NUNAMAKER, a citizen of the United States, residing at Chicago, in the county of Cook and State of Illinois, have invented new and useful Improvements in Voting-Machines, of which the following is a specification, reference being had to the accompanying drawings, forming a part thereof.

This invention relates to machines for the purpose of indicating votes cast at public elections, and for like purposes.

It consists in the features of construction set out in the claims.

Figure 1:
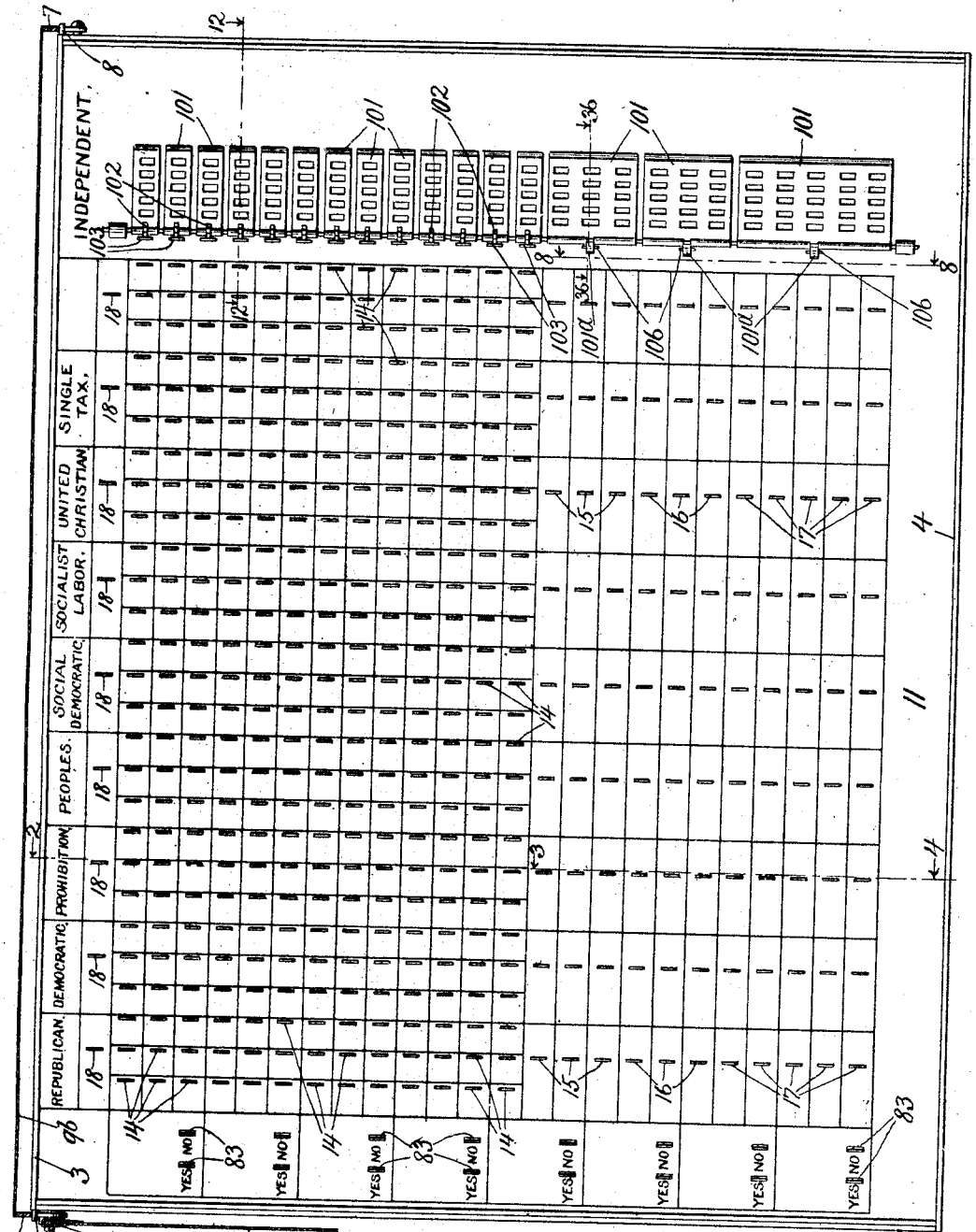
Figure 2:
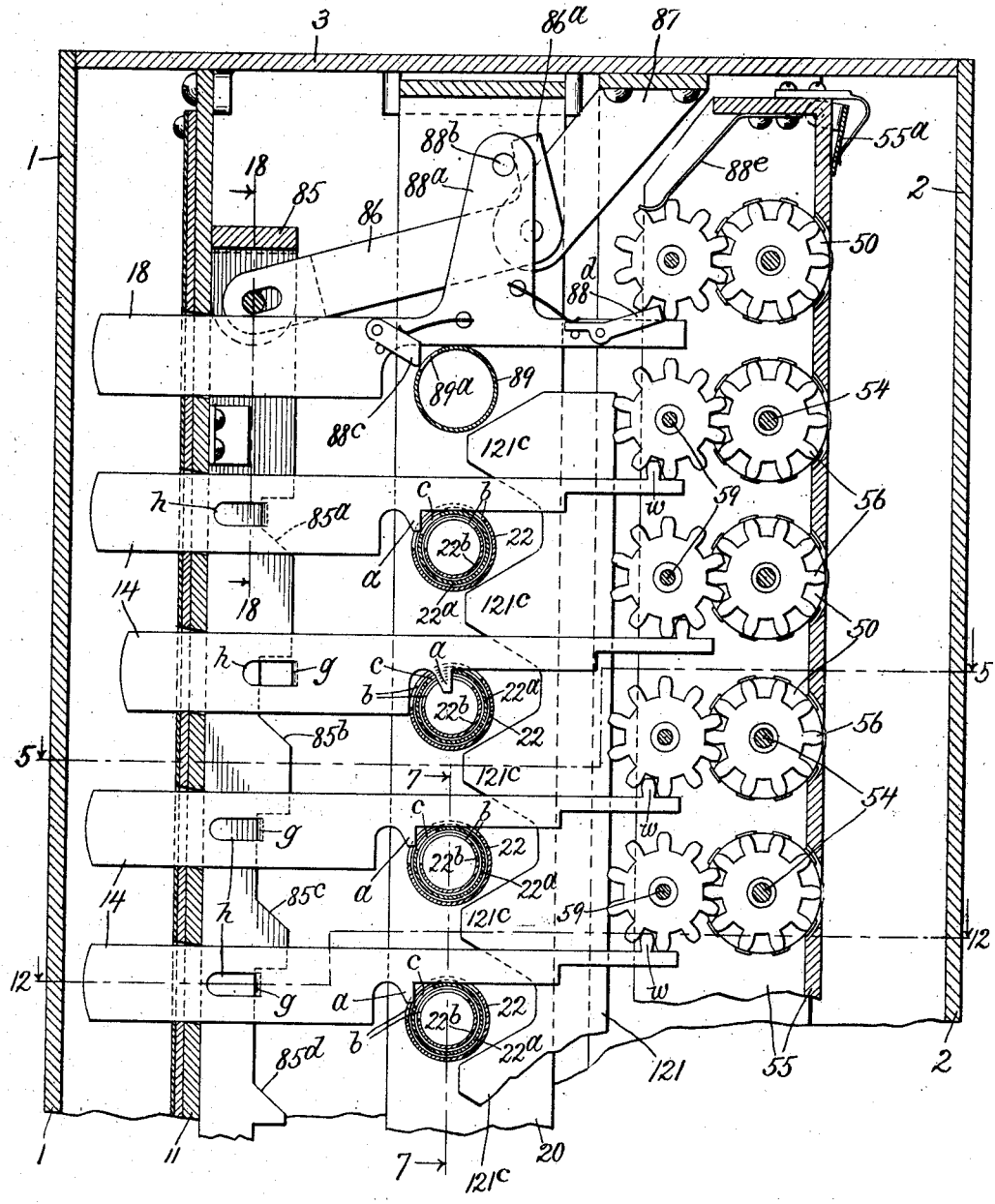
Figure 3:
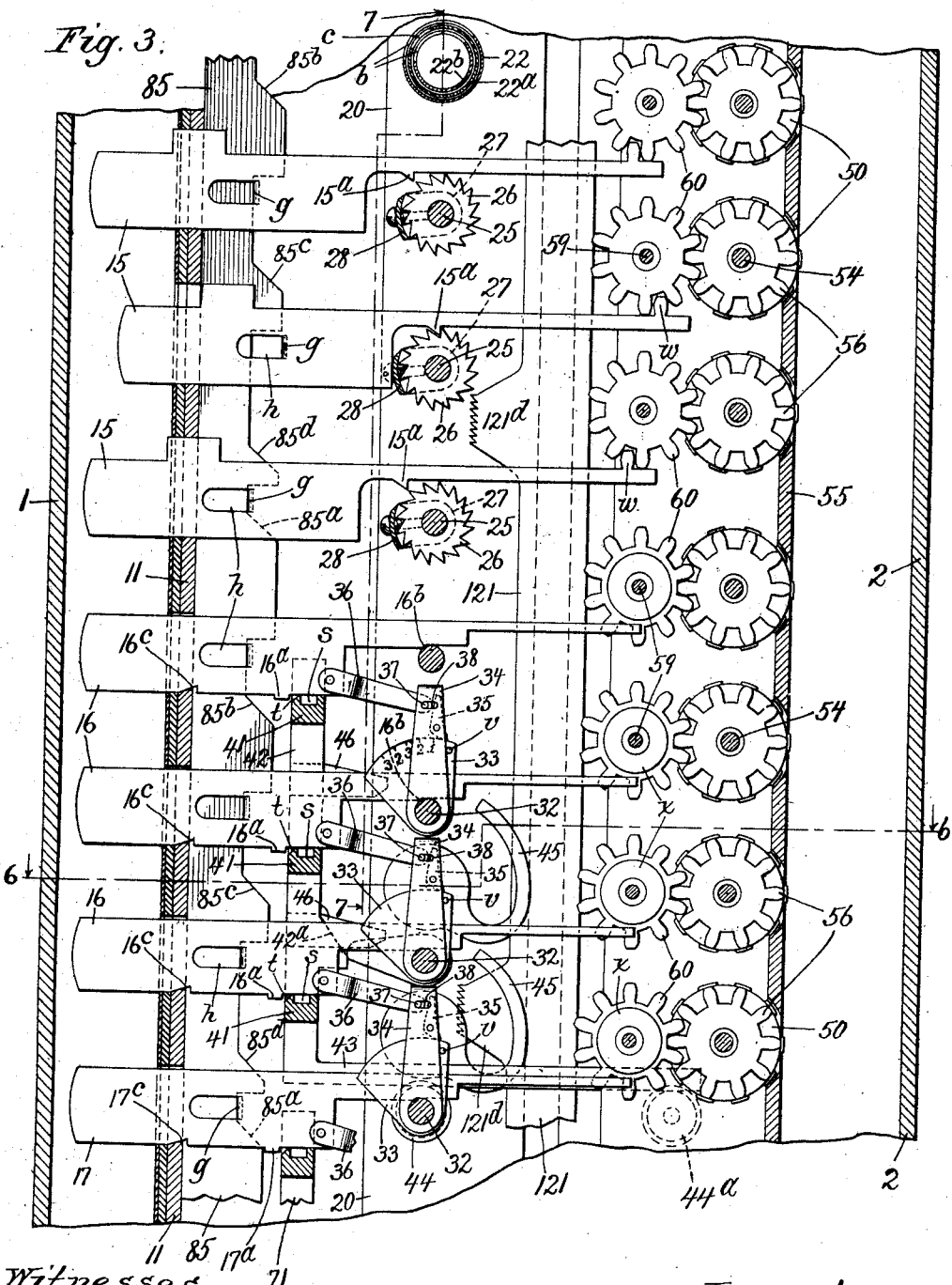
Figure 4:
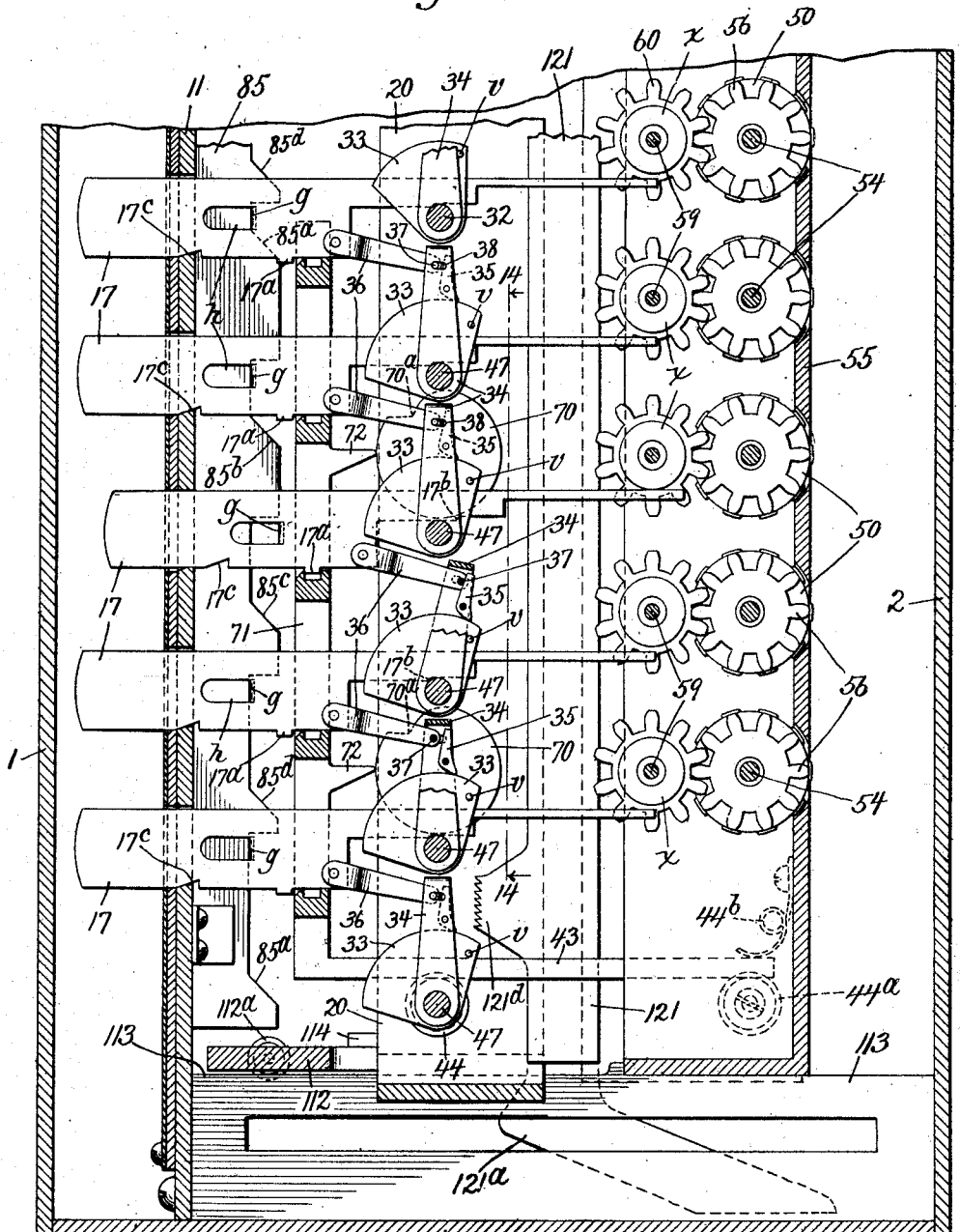
Figure 5:
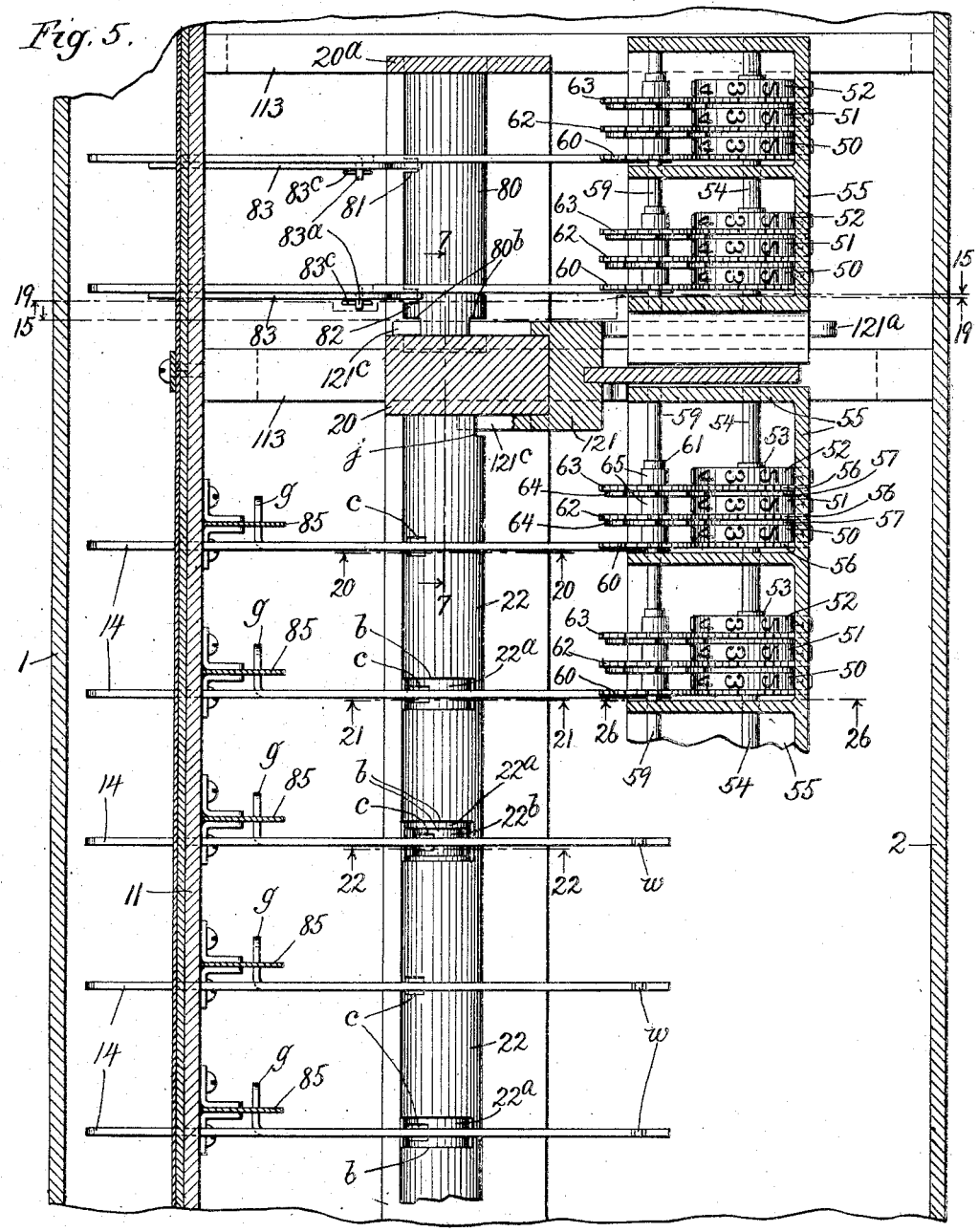
Figure 6:
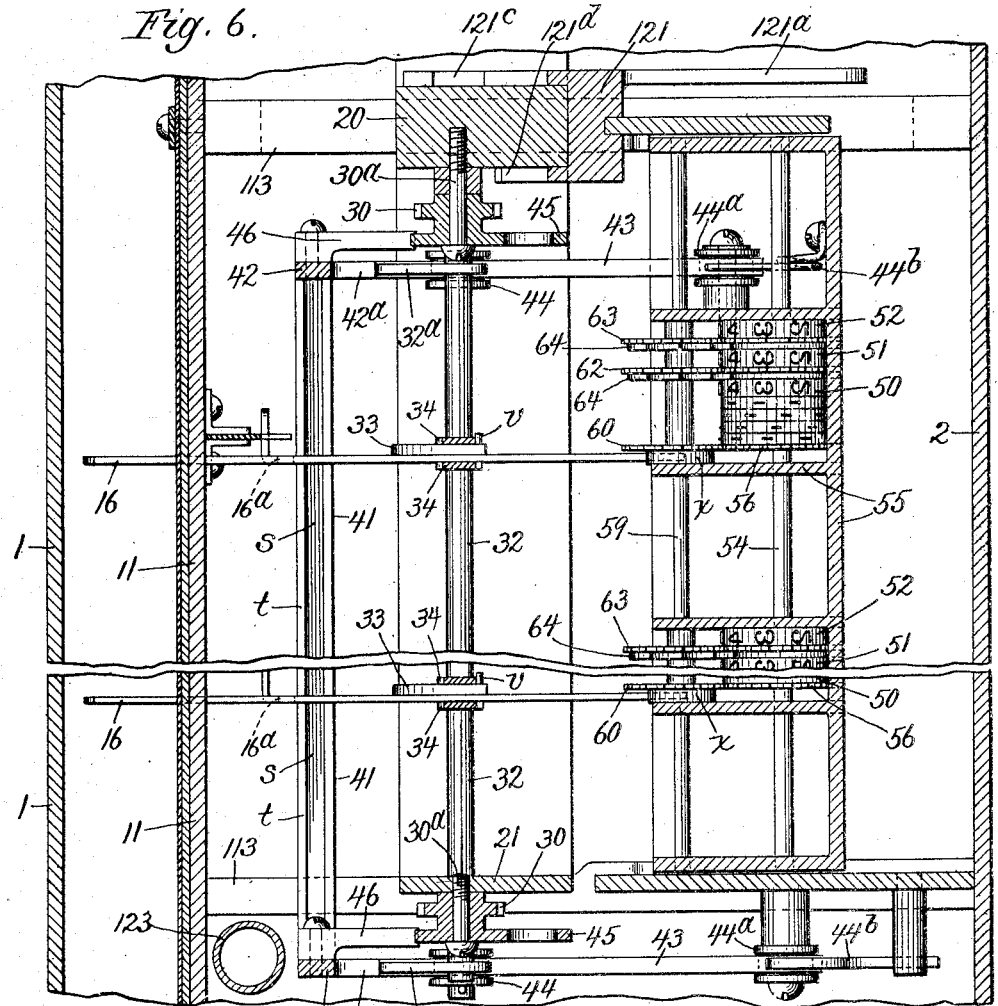
Figure 32:
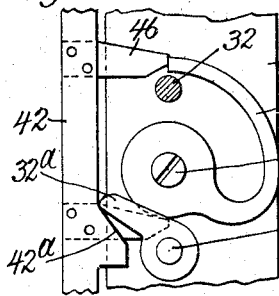
Figure 33:
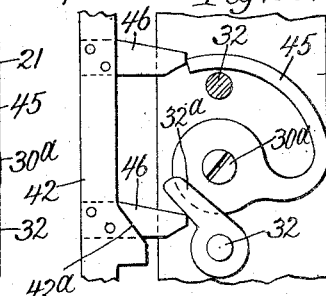
Figure 34:
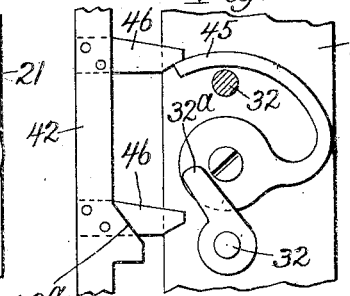
Figure 14:
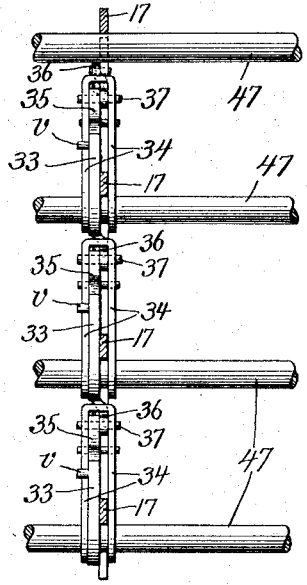
Figure 13:
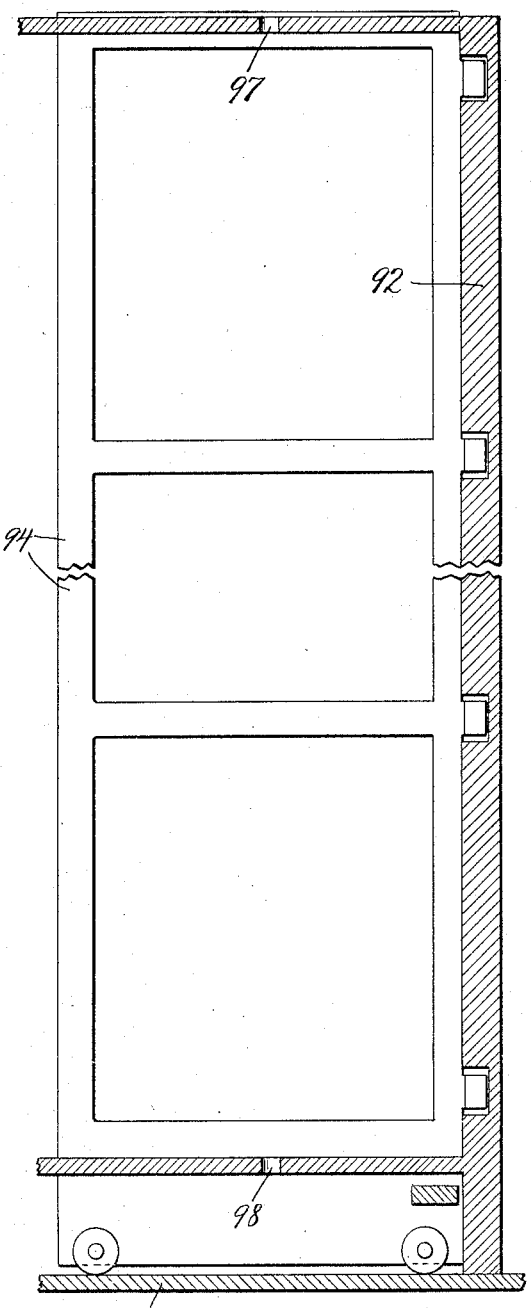
Figure 35:
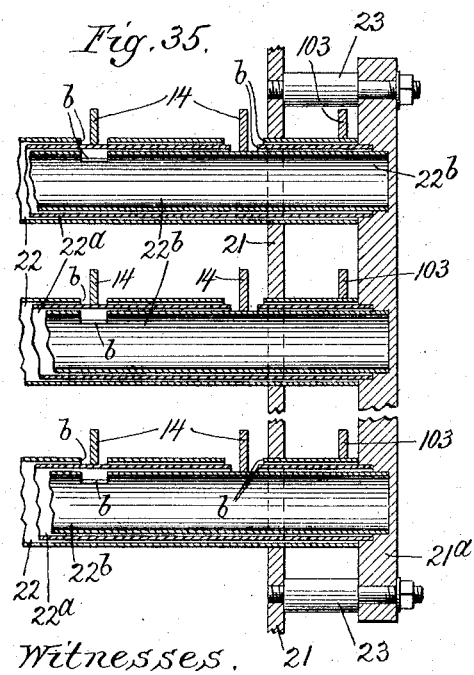
Figure 16:
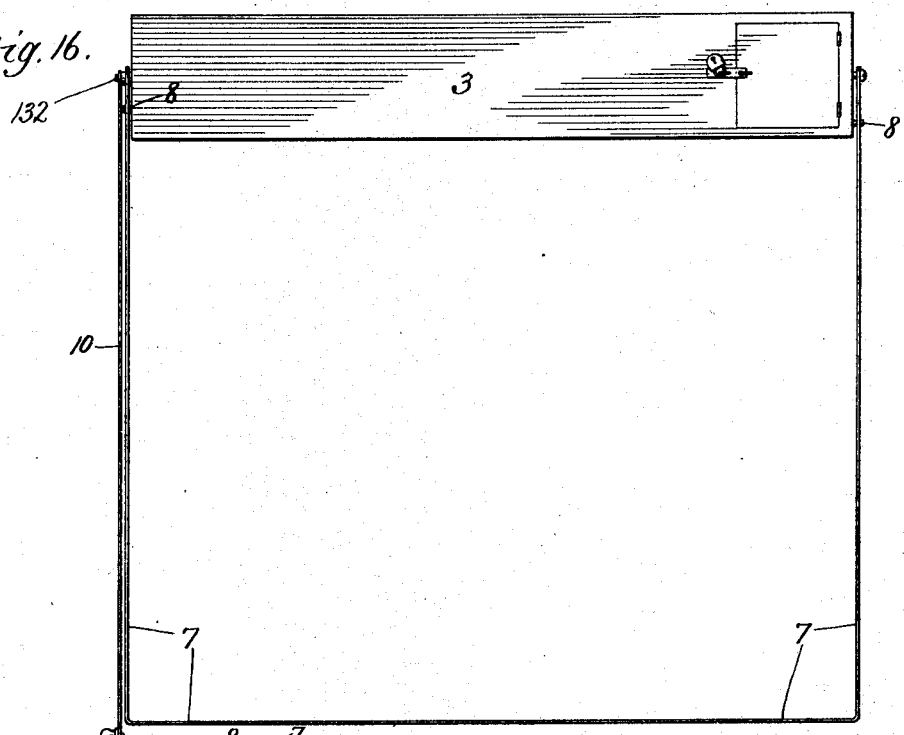
Figure 17:
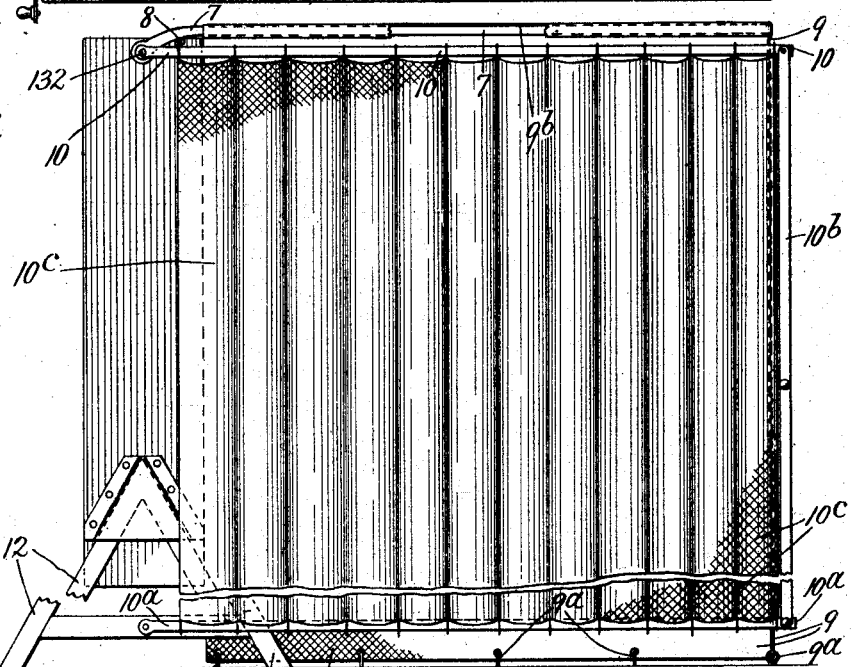
Figures 36, 37:
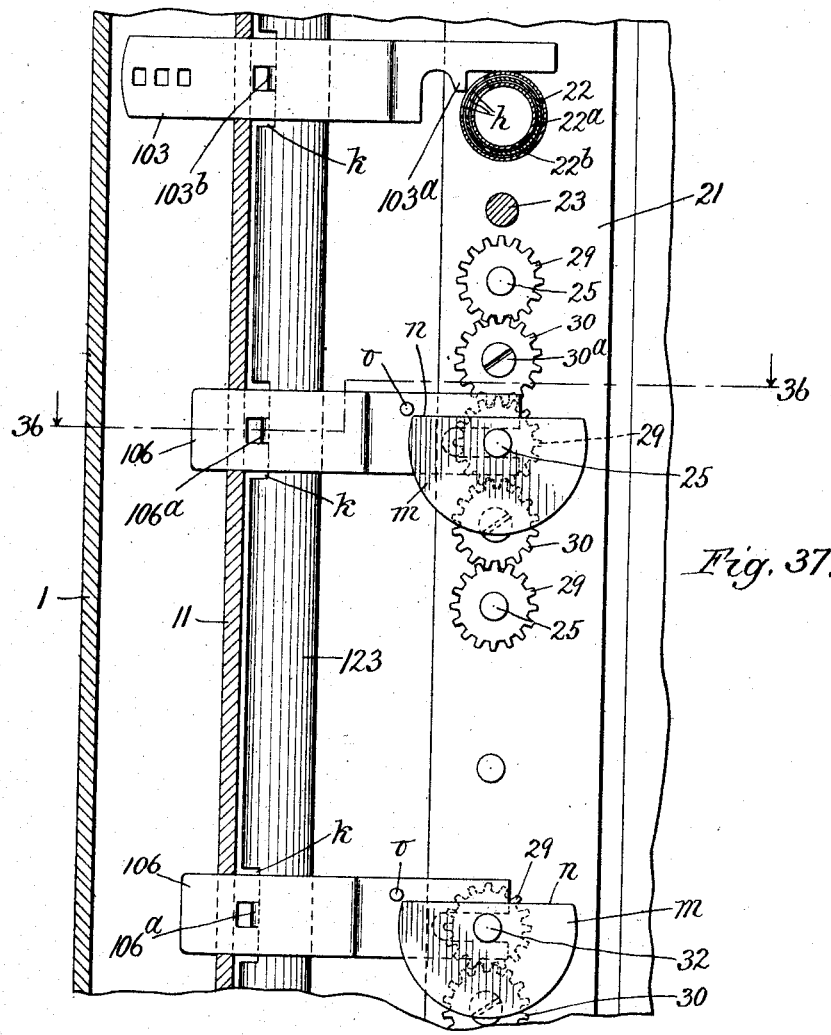

In the drawings:—Figure 1 is a forward side elevation of my machine. Figs. 2, 3 and 4 are successive portions of a fore-and-aft vertical section at the line, 2, 3, 4, on Fig. 1, being in the order of their numbers from the top to the bottom of the machine. Fig. 5 is a horizontal section at the line, 5—5, on Fig. 2, through a portion of the machine at the right hand end. Fig. 6 is a horizontal section at the line, 6—6, on Fig. 3, showing portions of a complete section at said plane at different parts of the length of the machine, intermediate and end portions being broken away to condense the view. Fig. 7 is a detail section at the vertical plane indicated by the line, 7—7, on Figs. 2, 3 and 5. Fig. 8 is a vertical fore-and-aft section at the plane indicated by the line, 8—8, on Fig. 10, but showing only a lower portion of the machine at such section as indicated by the position of the line, 8—8, on Fig. 1. Fig. 9 is a section at the plane of the line, 9—9, on Fig. 7, covering substantially the same vertical extent of the machine as Fig. 8. Fig. 10 is a horizontal section at the plane of the line, 10—10, on Fig. 8. Fig. 11 is a horizontal section at the line, 11—11, on Fig. 10. Fig. 12 is a horizontal section through the right hand end portion of the machine at the plane indicated by the line, 12—12, on Figs. 1 and 2. Fig. 13 is a vertical fore-and-aft section at the line, 13—13, on Fig. 12. Fig. 14 is a detail section at the line, 14—14, on Fig. 4. Fig. 15 is a detail vertical section at the line, 15—15, on Fig. 5. Fig. 16 is a detail top plan view of the machine. Fig. 17 is a detail end elevation of the same. Fig. 18 is a detail section at the line, 18—18, on Fig. 2. Fig. 19 is a detail section at the line, 19—19, on Fig. 5. Figs. 20, 21 and 22 are detail sections at the lines, 20—20, 21—21, and 22—22, respectively, on Fig. 5. Fig. 23 is an edge elevation of three of the registering wheels with their shaft, said wheels being shown separated. Fig. 24 is a similar view of the three wheels assembled on their shaft. Fig. 25 is an axial section of the same. Fig. 26 is a detail section at the line, 26—26, on Fig. 5. Fig. 27 shows an edge elevation of the three wheels on one shaft which mesh with the three register wheels shown in Fig. 24, and which appear in plan view in Fig. 5. Fig. 28 shows said three wheels separated, and their shaft in connection with one of them. Fig. 29 is a top plan of the train shown in Fig. 26. Fig. 30 is a section at the line, 30—30, on Fig. 29. Fig. 31 is a detail elevation showing two coöperating wheels of the train seen in Fig. 30 in different relative positions. Figs. 32, 33 and 34 are details showing in elevation at three different positions certain coöperating cam structures pertaining to the devices for distributing cumulative votes. Fig. 35 is a detail vertical section at the plane indicated by the line, 35—35, on Fig. 12. Fig. 36 is a horizontal section at the plane indicated by the line, 36—36, on Fig. 1 and also on Fig. 37. Fig. 37 is a vertical section at the line, 37—37, on Fig. 36.

This voting machine is contained within an outer case or cabinet, of which the front and rear walls, 1 and 2, and the top, 3, appear clearly in section in Fig. 2, the bottom appearing in Fig. 4, the left-hand end wall being shown in section in Fig. 10, and appearing in exterior view in Fig. 17, while the right-hand end wall is shown in horizontal section in Fig. 12. The entire case may be supported by any convenient form of standards, as, for example, A-frames, 12, of which one is attached to the left-hand end in Fig. 17. For the purpose of insuring the desired privacy for the voter in registering his vote, a space at the forward side of the machine is arranged to be inclosed to form a booth of which the case of the machine forms one wall. For the other three walls a three-sided frame or bail, 7, is pivotally attached at the ends of its side bars to the ends of the case at the upper part, and adapted to fold down about the case when it is stored away; but when extended into the horizontal position projecting forward from the top of the case, it is upheld by spring dogs, 8, 8, which must be thrust in to let it down. On two sides of this frame there are mounted curtains, 9, 9, which, when let down, reach the floor and having rods to stiffen them at the lower ends are designed to be stretched tight and secured to screw eyes, $9^a$, in the floor when the machine is in use, being also laced together at the corners so as to close up the space against any espionage of the voter; and to prevent the voter from being watched by means of mirrors from above; a ceiling, $9^b$, of white muslin may be stretched on the frame, 7.

The booth is to be entered at the left-hand side, which is closed by a collapsing door formed of upper and lower parallel bars, 10 and $10^a$, pivotally attached to the left-hand end of the case, and connected at their otherwise free ends by a link bar, $10^b$. On these parallel bars a puffed or fulled curtain, $10^c$, is stretched vertically, whose fullness permits the necessary elongation of one diagonal when the outer ends of the parallel bars and their connecting link bar are lifted until the bar, 10, is upright above its pivot. The bar, 10, is a lever arm of a rock-shaft, 132, which extends into the case for the purpose of operating certain mechanism therein, as herein explained, and the frame, 7, is conveniently pivoted loosely on the same shaft inside the bar, 10, so that the door comprising the bar, 10, swings up outside the frame, 7, which carries the ceiling. A spring, $10^a$, connected to a short arm, $10^b$, within the case (see Fig. 11) operates to throw the bar, 10, to either the upper limit of the movement—for opening the door, or to the lower limit—for closing the door when the door is swung either way past the middle point, thus insuring the completion of either movement when it is commenced and half performed by the voter.

The visible means for manipulating the machine for the purpose of indicating votes are push-bars, which are seen in end elevation in Fig. 1; and since this front elevation of the machine, when the doors are open disclosing these operating means, corresponds diagrammatically to the arrangement of the several mechanisms within, an understanding of that arrangement, without regard to details of mechanism, may be gained by consideration of said Fig. 1. In this figure there appears a fixed wall or plate, 11, shown also in section in Figs. 3, 4 and 5, which, when prepared for an election, presents a tabulated arrangement of the offices and candidates, the several columns separated from each other by vertically ruled lines being headed with the names of the various parties whose candidates are to be voted upon,—as for example, in said Fig. 1, "Republican", "Democratic", "Prohibition", "People's", "Social Democratic", "Socialist", "Labor", "United Christian", "Single Tax",—the column at the right of the last mentioned being of the same character, though without a title in the drawing. At the left of these columns, being at the extreme left-hand side of the tabular wall or plate, 11, is a column in which there may be presented propositions to be voted upon, as indicated by the words, "Yes" and "No;" and at the right hand portion of the tabular wall there is a column headed, "Independent", in which appear the means hereinafter described, by which the voter may cast his vote for any person whomsoever, not named upon any of the tickets presented in the other columns, for any of the offices for which the election is being held. The tabular space between the "Yes and No" column at the left and the "Independent" column at the right is subdivided into horizontal rows of spaces. The columns having party headings at the upper part, including thirteen of these horizontal rows, are subdivided each into three sub-columns, and from each of the rectangular spaces thus defined by the sub-columns and the horizontal rows there protrudes one of the push-bars, 14, each of which is adapted to operate interior mechanism hereinafter described for indicating a vote. These rectangular spaces, three in number in the width of each party column, and thirteen in number vertically, correspond to thirty-nine offices to each of which one person only is to be elected; and the similarly situated spaces respectively in all of the party columns correspond to the same offices the titles of which will be plainly indicated in such spaces, each space having also the name of the candidate nominated for that office by the party whose name heads the column. In the next 3 horizontal rows below the upper 13 rows there is in each party column, preferably at the middle of the width thereof, one push-bar, 15, these push-bars in the party column being in vertical line with the middle column of the push-bars, 14, in the same party column. The oblong spaces in the middle of which push-bars, 15, respectively, appear in each column contain the names of the candidates nominated by the parties respectively for offices, also indicated in said spaces, for which 3 persons may be elected but in respect to which cumulative voting is not permitted, as, for instance, in the case of circuit judges, the voter being privileged to cast one vote for each of 3 judges if he so desires, and to select the three at will from the whole list of candidates nominated by all parties, but not to cast more than one vote for any one candidate. In the next 3 horizontal rows below those having the push-bars, 15, there are similarly arranged in each party column push-bars, 16, in vertical line with the push-bars, 15, in the columns respectively; and these push-bars are connected with mechanism for indicating the votes which may be cast for the candidates whose names are written in the spaces respectively, for offices in which there are 3 persons to be elected, and in respect to which the law permits cumulative voting, as, for example, for representatives when each district is entitled to 3 representatives, and the voters are privileged to cast 3 votes, all for one candidate or 3 votes divided between two candidates, or 3 votes divided among 3 candidates. In the remaining spaces, of which there appear in the drawings five (5) below the nineteen (19) horizontal rows above indicated, at the middle of each space and in vertical line with the push-bars, 15 and 16, are push-bars, 17, which are connected with the mechanism for indicating the votes cast for the persons therein named, to fill the offices named in said spaces respectively, in such cases as, for example, that of the members of the board of trustees for the Chicago drainage district, in which, according to law, nine persons are to be selected as trustees, and each voter is privileged to cumulate the nine votes to which he is entitled upon 5 or more persons, but not upon any less than 5; that is to say,— so that if only 4 candidates are voted for, each candidate will receive one vote; but if 5 persons are voted for, the voter may, if he desires, give to each person receiving his vote, 1—4/5 votes; or if he votes for 6 persons, each may receive 1—1/2 votes; if he votes for 7, each may receive 1—2/7 votes; or if for 8, each will receive 1—1/8 votes; and if he votes for 9, each person voted for will receive one full vote only. The mechanism connected with these push-bars, 17, is constructed as hereinafter described, to effect the distribution automatically in accordance with such a law.

It will be understood that in using the numbers, "3" and "9", in illustrating and describing the plan and construction of this machine in respect to the several groups of push-bars and corresponding mechanisms, no limitation is intended to these numbers, but that the same principle and mode of operation is applicable and may be operatively applied to cases in which, for example, more than 3 candidates for offices of the same name are to be elected, with the privilege to the voter of selecting, but without the privilege of cumulating; or in cases in which more than 3 are to be elected with the privilege of cumulating; and also to cases in which more or less than 9 are to be elected with the privilege of cumulating limited otherwise than as above described.

In the column in which the words, "Yes" and "No" appear in the several spaces, there will be presented the propositions to be voted upon respectively. Any number of such spaces may be provided instead of the eight spaces shown.

At the right-hand of the party column spaces in the column headed, "Independent", there is in each horizontal line a horizontally swinging door, 101, which, being swung open exposes a card on which appears the title of the office to be filled, and on which, against such title, the voter may write the name of the person for whom he desires to vote. The push-bars are connected with registering mechanism hereinafter described, for indicating the votes cast by pushing them in; but it will be convenient first to describe the means for preventing over-voting.

To prevent the voter from casting for any office or candidate more than the lawful number of votes, the mechanism employed in respect to the thirty-nine offices for each of which the voter is entitled to cast only one vote, and to which the thirty-nine push-bars, 14, in each party column correspond, comprises, as the element first to be considered, thirteen series or sets of three concentric telescoped tubes, each denoted respectively, 22, 22$^a$ and 22$^b$, said series of telescoped tubes extending horizontally across the machine in positions corresponding to the thirteen lines of push-bars, 14. For supporting these tubes there are provided uprights, 20 and 21, the former at a position corresponding to the fore-and-aft plane of separation between the "Yes and No" column and the first party column, and seen in Figs. 5 and 7, the latter at the position corresponding to the fore-and-aft plane of separation between the last party column at the right and the "Independent" column, and seen in Fig. 12. Each of the three tubes, 22, 22$^a$ and 22$^b$, in each series is designed to rotate independently of the other tubes of the same series, and for that purpose is provided with independent support, such support being obtained in the upright, 20, by protruding the innermost tube, 22$^b$, beyond the middle tube, 22$^a$, and the latter, in turn, beyond the outer tube, 22, and forming in said upright a bearing in steps corresponding in diameter to the three tubes respectively, as seen clearly in Fig. 7, at the opposite end, in the upright, 21, for reasons which will appear in further description of the mechanism. Like independent support of the 3 tubes in each series is obtained by causing them all to protrude through said upright, and at a little distance therefrom, the inner tubes, 22$^a$ and 22$^b$, protrude into a step bearing in the supplemental bearing 21$^a$, which is spaced from and secured to the upright, 21, by the shoulder bolts, 23, 23, at the ends above and below the 13 series of tubes.

It will be seen that there are 3 offices in each party column corresponding to each of the 13 series of three tubes each. The outermost tubes of the 13 series correspond in the 13 lines respectively to the left-hand of the three offices in each party column, the middle tube to the middle office of the three in each column, and the inner tube to the right-hand office of the three in each column. If, for example, the left-hand space and push-bar in the upper line in each party column is devoted to the office of "Governor", the voter having operated that push-bar in any one of the party columns, must thereby be prevented from operating the corresponding push-bar in any other party column unless he first retracts the one first operated. But this must not interfere in any way with his pushing either the middle or the right-hand push-bar, in the same line in the same or any other party column. All three tubes of each series are provided with slots in the path of the fingers, $a$, of the push-bars respectively. The slots, $b$, of the middle and inner tubes in line with the left-hand push-bars in each party column are circumferentially extended so that the fingers, $a$, of said push-bars merely pass through them without engaging their edges to rock the tubes; but the slots, $c$, in the outer tubes are of such small size as to enable the finger to engage the edge of the slot when it enters it to rock the tube. Similarly, the slots, $b$, in the outer and inner tubes in line with the middle push-bar of each party column are circumferentially extended so as not to be engaged, while the middle tube only has its slot, $c$, of such limited extent that the finger engages the tube to rotate it, and the slots, $b$, of the outer and middle tubes in line with the push-bars at the right hand of each party column are elongated circumferentially, so that the said outer and middle tubes are not engaged by the finger, but only the inner tube has its slot, $c$, restricted so that the finger engages and rotates that tube. Any push-bar having been thrust in and engaged and rotated, the tube to which it corresponds will carry all the slots in that tube throughout the entire length around so far that no opening will be presented to the finger of any other push-bar in the line, and thus the voter having, by thrusting in the first push-bar for any office, temporarily registered his vote for the candidate named in the space in which said bar was located, is prevented from voting for any other candidate for that office. The voter may, however, withdraw the push-bar which he first thrusts in, and by so doing he will rock the tube back to its initial position, and he may then thrust in the push-bar corresponding to the same office in any other party column. But by retracting the push-bar first thrust in, he will have undone or canceled the registration of the vote first indicated, as will be hereinafter apparent when the registering mechanism is described.

The mechanism operated by the push-bars, 15, for preventing over-voting upon offices of which there are a plurality,—as three,—of the same name, but in which the voter is not privileged to cumulate his vote, may be understood from the upper part of Fig. 3. In the horizontal plane of the lines in which the rows of push-bars, 15, stand, there are journaled at their opposite ends in the uprights, 20 and 21, shafts, 25, corresponding in number to the number of offices of the same name to be voted upon,—as illustrated, three. Upon each of these shafts, in the fore-and-aft plane of each of the push-bars, 15, there is made fast a ratchet disk, 26, these disks corresponding in number, therefore, in the entire machine, to the total number of candidates which may be presented for the three offices of the same name to be voted upon in this manner. Adjacent to each of the ratchet disks, 26, there is mounted on the shaft a collar, 27, having extending from it a hood, 28, which overhangs and shields a portion of the toothed periphery of the ratchet disk. The collar is adapted to be secured to the shaft by a set screw, and may be adjusted as desired about the shaft. All the shafts, 25, are geared together by means of gears, 29, 29, on said shafts, respectively, one near each end near the uprights, 20 and 21, respectively; and their intermediate gears, 30, are mounted on stud axles, $30^a$, set in said uprights, so that the rotation of any one of the shafts, 25, rotates all the shafts of the series in the same direction and through the same angle. The push-bars, 15, have each a feeding tooth, $15^a$, to engage with the ratchet disk to which the push-bar corresponds, to rotate the disk and thereby rotate not only the shaft of that particular disk, but all the shafts and all the disks of the system, one step at a time for each thrust of any push-bar, 15. As hereinafter explained, each such thrust operates registering mechanism to indicate one vote for the candidate to whose name the push-bar corresponds. The push-bars, however, when retracted, undo and cancel the register of the votes indicated by thrusting them in, and also reverse the rotation of their respective ratchet disks, and thereby of the entire system of shafts, 25, to the extent to which they were rotated by the inthrust of the push-bar. After any push-bar has been thrust in, however, to register a vote for the candidate to which it corresponds, any other bar in the system,—i. e., in any one of the three lines in which the bars, 15, are located,—being thrust in, will register a vote for the candidate to which such other corresponds, and will cause all the ratchets to advance one step; the ratchet, however, which was first operated and with which the push-bar which operated it stands engaged, being lifted by reverse movement back past the operating tooth, $15^a$ of the bar, so that registration of the vote which was made by the inthrust of said bar, stands unaltered. In this manner vote after vote may be registered until by the rotation of the shafts, 15, the hoods, 28, are carried around so far as to stand in the path of the operating teeth, $15^a$, where they prevent the inthrust of any more bars, and so prevent the registration of any more votes in this system. The hoods will be set to permit three teeth to be engaged in succession and no more before the hoods become interposed, and thus three votes only may be registered by thrusting in three bars, 15, selected at the will of the voter from the entire number corresponding to the candidates of all parties for three offices. The adjustment of the hoods may be made for any other number than three, according to the number of persons to be elected to the office in question.

The mechanism by which the push-bars, 16, operate to prevent over-voting and to properly distribute the votes which may be cast cumulatively or distributively at the will of the voter, for one or more of all of the three or more candidates for offices of the same name, may be understood from Figs. 3, 8, 32, 33 and 34. This mechanism comprises a series of shafts, 32, journaled in the uprights, 20 and 21, in the same vertical plane with the shafts, 25, above described, and each extending across under an entire horizontal row of push-bars, 16, the lowest of said shafts extending under the row of push-bars next below the lowest row of bars, 16. On each of the shafts, 32, there are supported for coöperation with the push-bar of the row next above devices which may be understood from Fig. 3, comprising a segment disk, 33, rigid with the shaft and loosely mounted on the shaft striding this segment, a saddle or forked lever, 34, which carries between its fork arms a dog, 35, pivoted with relation to the periphery of the segment so as to operate with frictional grip thereon, and to the next push-bar above, there is pivotally connected one end of a link, 36, the other end of which is pivoted to the lever or saddle, 34, the pivot pin, 37, being fast in the link and extending through slots, 38, in the saddle, so that it has a slight play at that connection, the upstanding end or tailpiece of the dog being in position to be encountered by the pin when the link is pushed forward by the commencement of the inthrust movement of the push-bar, 16, to which the link is connected. At the normal position of the parts, before the push-bar is thrust in, the dog rests upon the periphery of the segment disk near the farther limit of the disk, and the inner end of the push-bar is out of contact with the initial wheel of the registering train (which is to be positively engaged, as hereinafter explained). When the push-bar is thrust inward, while the slight play of the pin, 37, in the slots, 38, is being taken up the push-bar resting on a shaft, 30, is crowded up into engagement with said initial wheel by the slight shoulder, 16$^b$, on its lower edge which rides up onto the shaft, and a sloping faced notch, 16$^c$, in the lower edge of the push-bar operates to the same effect in engagement with the lower edge of the slot through which the push-bar plays in the plate, 11. When said play is taken up the pin, 37, presses the dog and it grips the disk and rocks the shaft through an angle corresponding to the inthrust stroke of the push-bar. The inthrust of the bar is limited by means hereinafter described, so as to actuate the registering mechanism for the registration of the maximum number of votes to which the voter is entitled. In the structure illustrated, this is three full votes. This movement rocks the segment disk pertaining to the push-bar, which is first thrust in through a certain angle indicated by the graduation on one of the segments seen in Fig. 3, in which each division mark corresponds to an actuation which will register one vote; and the angle between zero and three, therefore, indicates the angle corresponding to a three-vote thrust of the bar.

Each of the shafts, 32, has gears, 29, in like position to the other gears, 29, on the shafts, 25, and they are similarly connected by intermediate gears, 30, causing the rotation of any one of the shafts of the series to be communicated in the same direction to all the others. Whenever a voter thrusts in one of the bars, 16, to register three votes for the candidate whose name appears in the space appropriated to such bar, all the shafts, 32, of the series will be actuated to rock their segment disks through the angle corresponding to three votes; but the push-bars pertaining to all the other disks will remain unmoved, the disks rocking idly under the dogs pertaining to the bars which are not actuated.

Between the vertical plane of the shaft, 32, and the front or tabular plate, 11, there is located a frame which, for convenience of identification, I term a "ladder". This ladder comprises horizontal bars, 41, connected by uprights, 42; and has at the lower end rearwardly extending horizontal guide arms, 43, which lodge upon rollers, 44, on the uprights, 20 and 21, and rollers on a fixed part—as the frame—of the register trains, so that the ladder may have a fore-and-aft movement bodily. Each of the horizontal bars, 41, has a groove, $s$, in its upper edge, and is beveled at the forward side of the upper edge at $t$, to permit a tooth, 16$^a$, which projects from the lower edge of each of the push-bars, and in the normal position of the parts stands just in front of the cross-bar of the ladder, to ride up on the edge of the cross-bar and drop into the grooves when the push-bar is first thrust rearward. Such action is rendered possible, both by the springing of the rear end portion of the push-bar which is reduced in thickness to make it sufficiently elastic to obtain good pressure for the frictional engagement mentioned against the initial wheel of the registering train, and also by the upward yielding of the rear ends of the ladder guide arms, 43, which are held down on the rear rollers, 44$^a$, by springs, 44$^b$. The movement which the push-bar will make before thus becoming engaged with the ladder is sufficient to register one vote; and when the first push-bar of the series is pushed in to record three votes it carries the ladder in bodily a distance corresponding to two votes. If the voter now desires to vote for two candidates, each candidate can receive only $1\frac{1}{2}$ votes, and the candidate for whom he has first voted having already received three votes must lose a vote and a half by retraction of the registering mechanism to that extent; and if the voter should desire to vote for a third candidate, each of the two preceding candidates having already received a vote and a half must lose half a vote by similar subtraction. To produce these results from the second and third votes there is secured to each of the intermediate gears, 30, a finger, 45; and to each of the vertical bars of the ladder, fingers, 46, which project in the vertical plane of the fingers, 45. The latter, at the normal position of the intermediate gears, before any vote has been cast in this group, stand at such position that the rocking of the shafts, 32, for three votes will bring said finger, 45, into contact with the ends of the fingers, 46, when those fingers are moved in a distance of two votes, as they will be moved when the ladder is carried this distance by the engagement of the tooth, $16^a$, in the grooves, $s$.

Now, it will be noticed that since all the shafts are rotated equally, all the fingers, 45, are thus rocked over to meet the corresponding fingers, 46, of the ladder; and when the second push-bar selected by the voter is thrust inward to vote for a second candidate, the rocking movement which will be communicated to all the intermediate gears of this group by means of the lever and dog connected with that push-bar operating on the associated segment disk, will carry all the fingers, 45, over forward; and since they are now in contact with the fingers, 46, they will push the ladder back a distance equal substantially to the in-thrust of the second bar. The ladder will thus move back a distance equal to a vote and a half, while the second bar is moving in a distance equal to a vote and a half; and the tooth, $16^a$, of the bar will become engaged with the grooves of the ladder, and the bar will be thereby stopped at the limit of such vote-and-a-half thrust, and the retreating movement of the ladder will retract the bar which was first thrust in and cause it to retract the registering mechanism a distance to subtract a vote-and-a-half from the registration in favor of the candidate first voted for, thus leaving the two candidates each with a vote and a half. When a third bar is selected and thrust in, a single vote must be registered and a half vote subtracted from the two preceding registrations; the two preceding push-bars, therefore, must be drawn back half as far as the third one is thrust in. The fingers, 45, it will be noticed are resting against the end of the fingers, 46; and as the latter are rocked through the distance corresponding to one full vote by the inthrust of the third bar, they will push back the ladder; and in order that they may not push it back more than a distance corresponding to a half vote, it is only necessary that the end of the finger, 46, be cut away from the point at which the finger, 45, bears against it after having pushed it back half a vote, so as to leave free paths for the finger, 45, in the arcs in which it moves as the gear rocks beyond that point in completing a full vote movement of the last push-bar. The finger, 46, is shown thus cut away in the enlarged detail seen in Figs. 32 and 33. It will be evident that the same means is adapted for cumulative or distributive voting for a larger number of candidates than three. For example, if the full number of votes which the voter is entitled to cast were five instead of three, the first thrust would register five votes; the second would subtract $2\frac{1}{2}$ votes from the first and register $2\frac{1}{2}$ votes for the second; the third bar thrust in would reduce the preceding registrations from $2\frac{1}{2}$ to $1\frac{2}{3}$ votes, subtracting $\frac{5}{6}$ of a vote from each, while registering $1\frac{2}{3}$ in its own registering train; the fourth bar thrust in would reduce the registrations made by the preceding three from $1\frac{2}{3}$ to $1\frac{1}{4}$ votes, subtracting from each $\frac{5}{12}$, while registering $1\frac{1}{4}$ votes for itself, and the fifth bar thrust in would reduce the $1\frac{1}{4}$ votes registered by each of the preceding four, to one vote each by subtraction of a quarter vote from each while registering one full vote for itself. The range of angular movement through which the finger, 45, can operate in the manner indicated is practically from about 60 degrees rearward beyond the vertical position, to the horizontal position extending forward; and this range of 150 degrees can be made sufficient for five or six successive votes.

The mechanism for distributing the votes made by the five push-bars, 17, constituting the series for voting for such offices as nine drainage trustees, as above described, comprises segment disks, 33, and dogs, 35, for operating them, connected by links, 36, with the push-bars as already described with respect to the preceding series above; and the shafts, 47, upon which these segment disks are mounted are geared together in the same manner as the shafts, 25 and 32 above,—i. e., by gears, 29, on each of the shafts, 47, and intermediate gears, 30, deriving movement in the opposite direction and communicating movements of the shafts in the same direction. Rigid with any two of the intermediate gears in this series, preferably the one between the first and second shafts of the series and the one between the third and fourth, there are cam disks, 70, 70, and in the same fore-and-aft plane with these disks are ladders, 71, similar to the ladders above described and similarly supported and guided. These ladders have fingers, 72, which, at the normal position of the ladders, rest upon the circular portion of the periphery of the cam disks, so that the ladders are stopped against inward movement by the disks. Each of the first four push-bars operated, whether taken from one party column or by selection from all columns, therefore, can cause registration of only one vote, because the tooth, 17$^a$, of the push-bar will become engaged with the groove, S, in the horizontal bar of the ladder upon being thrust in one vote's distance. But the operation of the four bars thus thrust in will rock the shafts through an angle corresponding to four votes, and, carrying the cam disks through a similar angle, will bring nearly opposite the fingers, 72, of the ladders, the recessed or cut-away portion, 70$^a$, of the cam, so that the fifth bar thrust in, upon engaging the ladder at the end of a thrust which registers one vote, having in so much of its thrust rocked the cam a few degrees will carry the ladder inward as far as the depth of the recess, 70$^a$, will permit, and will thereby carry inward all four of the bars previously thrust in for one vote each and engaged with the ladder. The full depth of the recess, 70$^a$, is equal to $\frac{4}{5}$ of one full vote's distance; and the fifth bar thus brings the indication made by the five bars, to $1\frac{4}{5}$ votes each. If a sixth bar is thrust in, the cam disks will be rotated with the periphery at the recess in contact with the finger, 72, and this periphery is shaped so that the in-thrust of said sixth bar for a sufficient distance to register $1\frac{1}{2}$ votes will crowd back the ladder and all the five preceding bars connected with it a distance sufficient to subtract from each $\frac{9}{10}$ of a vote, leaving them each at the limit of a vote and a half when the finger of the sixth bar meets and engages the ladder and is stopped thereby. Similarly, when the seventh bar is thrust in for $1\frac{1}{2}$ votes, the preceding bars are thrust back by the cam disks enough to reduce the vote of each to $1\frac{2}{7}$. When the eighth bar is thrust in for $1\frac{1}{8}$ votes, the preceding seven are thrust back so as to reduce the vote of each to $1\frac{1}{8}$; and when the ninth bar is thrust in for one full vote, the preceding eight are thrust back so that the nine bars each record one vote only. By the in-thrust of the ninth bar selected from the entire number in all the party columns, the cam is rocked so far as to bring the tooth, 70$^b$, back onto the upper edge of the finger, 72; and further rocking in that direction is thereby stopped, and no more bars can be thrust in, thus limiting the vote to the prescribed maximum number, nine.

For the purpose of voting upon any of the propositions submitted in the "Yes" and "No" column, and preventing the registration of inconsistent votes upon each, there are journaled in the upright, 20, and in an upright, 20$^a$, at the left thereof, short tubes, 80. Each of the tubes has two slots, 81, 82, in position to be engaged respectively by the pushers, 83, which are loosely connected to the "Yes" and "No" push-bars, and have each an expanded terminal provided with V-shaped notches, $e$ and $f$. The total width of the expanded terminal is greater than the width of the slots, 81, 82, each of the notches, $e$ and $f$, being at a distance from the more remote edge of the terminal a distance not greater than the width of the slots, so that either notch being engaged with one edge of the slot, the opposite corner of the terminal will pass into the slot when the push-bar is thrust in, and the tube will be rocked one way or the other, according to whether the upper notch, $e$, or the lower notch, $f$, is engaged. The normal position of the tubes to which they are returned, as hereinafter explained, at the conclusion of each voter's use of the machine, is such that the upper notch, $e$, engages with the upper edge of the slot, as seen in Fig. 19, when the push-bar is thrust in. The thrust of the bar sufficient to register one vote rocks the tube to the position shown with respect to the lower push-bar in Fig. 19, bringing the lower edge of the slot around and up to a position bearing the same relation to the notch, $f$, as the upper edge at normal position bears to the notch, $e$. After one of the bars of a given pair pertaining to any one proposition submitted for vote has been pushed in to engage the tube at normal position and rock it to the position for indicating a vote, if the voter should push in the opposite push-bar of the pair, the pusher, 83, on the latter bar would engage, by the notch, $f$, the lower edge of its slot, rock the tube back, causing the upper edge of the slot with which the notch, $e$, of the first bar is engaged to retract that bar and cancel the affirmative vote first cast, and at the same time indicating a negative vote, since the bar is thrust in the same direction and will actuate the registering train in the same direction, regardless of the direction in which the tube is rocked. The loose connection mentioned, of the pusher to the push-bar is made by a stud, 83$^a$, jutting sideward from the push-bar into an oblong obliquely placed rectangular slot, 83$^b$, in the pusher which is otherwise free and slides at the outer end on the slot of the plate, 11, alongside the push-bar. A cotter pin, 83$^c$, through the stud, 83$^a$, keeps the pusher in connection with the push-bar at the inner end. The purpose of making the slot inclined is to assist the pusher in making the upward movement at its inner end, which results from its engagement with the upper edge of the slot in the tube, 80, while it pivots at the lodgment in the slot of the plate, 11. When it engages the lower edge of the slot in the tube, it fulcrums on the stud, 83$^a$, its forward end being lifted in the slot in the plate, 11.

For the purpose of permitting and enabling the voter to cast his vote for an entire party ticket at one action, subject to cancellation as to any individual office and subsequent vote upon that office under another party heading, I provide means for actuating all the push-bars by one operation. For this purpose, each of the push-bars in the series, 14, 15, 16 and 17, is provided with a laterally projecting finger, $g$, which is conveniently made by striking the material from the push-bar into position at right angles therewith, leaving the aperture, $h$, as seen in Figs. 2, 3 and 4, the finger itself being clearly seen in Figs. 6 and 18; and immediately inside the plate, 11, in each party column there is mounted so as to slide vertically on that plate in suitable guides, a cam-bar, 85. A bell-crank-lever, 86, fulcrumed on a bracket, 87, projected down from the top plate, 3, is arranged to be engaged on its upwardly projecting arm, 86$^a$, by a stud, 18$^b$, which projects from the upstanding finger, 18$^a$, of the push-bar, 18, in each party column. This push-bar, by means of the dog, 88$^a$, engages and operates a registering train similar to all the other registering trains operated by the other push-bars, and hereinafter fully described. Extending underneath all the straight ticket push-bars, 18, there is a single tube, 89, having a slot, 89$^a$, for engagement of the pivoted finger, 18$^a$, of the bar, 18, which operates in the same manner as the fingers, $a$, of the other push-bars in relation to the tube which is engaged thereby; i. e., so that any one straight ticket push-bar, 18, having been thrust in to cast a straight party vote, rocks the tube, 89, so that no other straight ticket push bar can be pushed in. The operation of any of the straight ticket push-bars, 18, to register a party vote, causes the stud, 88$^b$, to operate the bell-crank lever, 86, which lifts the cam-bar, 85, whose inclined edges, 85$^a$, 85$^b$, 85$^c$, and 85$^d$, operate respectively upon the first, fifth, ninth, thirteenth and seventeenth, second, sixth, tenth, fourteenth and eighteenth, third, seventh, eleventh, fifteenth and nineteenth, and fourth, eighth, twelfth, sixteenth and twenty-fourth of the push-bars, 14, 15, 16 and 17, numbering from above downward. The distances between the successive inclined edges, 85$^a$, 85$^b$, 85$^c$, and 85$^d$, are successively longer and longer by the amount of the vertical component of the slope of the said inclined edges, so that the work of forcing inward the twenty-four push-bars will not have to be performed simultaneously, but in four successive groups of six each, as the cam-plate is lifted by the bell-crank-lever, 86. All the push-bars in the party column in which the straight ticket push-bar, 18, is operated, being thus thrust in, the entire party ticket will be voted at one action. If the voter desires to vote for any individual candidate on a different ticket, he may retract the push-bar corresponding to the candidate for that office in the ticket which he has voted straight, and thereby cancel that one vote; and in doing so he will reverse the stop mechanism pertaining to that office, leaving the way open for him to vote for the candidate of another party for the same office, which he may do by thrusting in the push-bar for that candidate. A further, and indeed the more important reason for arranging the cam-plate, 85, with its slopes separated by increasing distances from above downward, as described, is that thereby in the groups of mechanisms represented by the push-bars, 15, 16, and 17, i. e., in the groups in which there may be a plurality of candidates voted for,—the action in respect to distributing the votes for these candidates and giving to each candidate the proper full or fractional votes, may be the same as when they are voted by pushing in different push-bars successively; for it will be seen that if all the push-bars of these series having several shafts geared together were thrust in simultaneously, the effect would be upon each shaft precisely that of thrusting in only one push-bar and giving to each candidate one full vote only; and these mechanisms failing thus to be actuated to the extent necessary for locking them against further action, the voter, in addition to the full ticket first voted, might vote on these offices in which a plurality of names may be voted for, for as many names in other tickets as if he had voted for only one name in each case in the first ticket.

In respect to the group of mechanisms represented by the bars, 17, it will be seen that only five of these bars being provided, although nine votes may be cast for nine different persons if desired, for the reason that customarily in such cases no party nominates more than five out of nine, because, under the system of cumulative voting, the party must be overwhelmingly strong to elect more than a bare majority; and to do this safely it must divide the nine votes among the five candidates which it nominates. Nevertheless, since the voter must be left free to distribute his votes among nine candidates, the mechanism described is such that in addition to voting, if he desires, for the five candidates of one party, he may select the remaining four candidates from the other parties; or he may scatter the nine votes at will among all the tickets. In voting the straight party ticket, by use of the straight ticket push-bar, 18, the five party candidates in this class will receive $1\frac{4}{5}$ votes each; but the voter may afterward add additional votes to the number of four from the other parties, making a total of nine, precisely as if the first five in the party column selected had been voted individually instead of by means of the straight ticket push-bar. In the case, however, of the mechanism represented by push-bars, 15 and 16, since there are presumed to be in each party column candidates for the full number for which the voter is entitled to vote (as illustrated, three in each class) the vote by means of the straight ticket push-bar, giving the three party candidates in each of these classes one full vote, exhausts the option of power of selection of the voter, and he cannot add to his vote for these offices by any selection from the other party columns. The weight of the cam-bar, 85, causes the push-bar, 18, to be retracted when the voter releases it after having thrust it in to cast a straight ticket vote, but the tube is not thereby rocked back because the finger, 18ª, is pivoted and free to swing in the direction for riding back over the lower edge of the slot whose upper edge it engages in the inward movement. The "straight vote" therefore cannot be canceled except one name at a time—by retracting the individual push-bars of the several series in the party columns.

If a voter desires to cast his vote for persons not named as candidates on any of the party tickets and for which, therefore, he cannot vote by operating push-bars, provision is made for casting his vote by opening the proper door or doors, 101, and writing the names of such persons under the titles of the offices respectively, on a card or sheet, 90, of which a suitable quantity are assembled behind the doors in the compartment, 91, between the vertical fore-and-aft partitions, 92 and 93. (See Fig. 12.) These cards or voting sheets are held up against an apertured carrier-plate or gridiron, 94, which constitutes the forward boundary of the compartment, 91, by means of a follower, 96, which has the upper and lower gudgeons 96ª, guided in fore-and-aft grooves, 97, 98, in top and bottom plates of the compartment, and engaged also in the slots, 99ª of the lever arms, 99, 99, which are fulcrumed vertically at the right-hand end of the case and subject to the action of springs, 100, tending to swing them forward at their slotted ends which engage the gudgeons of the follower, 96. For each horizontal line of push-bars corresponding to a series of tubes or to a shaft, 25, 32, or 47, there is a separate door, 101, covering a corresponding portion of the apertured plate or gridiron, 94, through which the cards, 90, are accessible for writing thereon. Each door, 101, has rigid with it and constituting one element of its hinge, a gear segment, 102, which meshes with a rack-bar, 103, extending fore-and-aft through the tabular wall, 11, and guided therein. These rack-bars correspond in function to the push-bars which are operated by the voter in voting for candidates whose names appear on the tabular wall, in so far as to prevent voting for a second candidate for any office or for more than the proper number of candidates for offices for which more than one may be voted for; and for this purpose the upper thirteen of each of said rack-bars, 103, has each a tooth, 103ª, which engages a slot, $h$, in one of the tubes, 22, 22ª and 22ᵇ, to rock said tubes when the rack-bar is thrust in, carrying their respective slots with which the other push-bars are adapted to engage out of position for engagement with the latter.

In each of the upper thirteen lines in which it will be remembered there are three offices to be voted for in each party column, the same three offices are denoted in the same line on the cards, and space is allowed for writing the name of a candidate under each. In any instance, therefore, in which the voter wishes to cast a vote for an unnominated candidate for any one of the three offices in a given line, he must of necessity vote for all three offices in that line in the same manner,—i. e., by writing the name of his candidate on the card,—even though, as to the other two, the names are those which are found in the party columns; because otherwise, upon casting a vote by means of one of the push-bars, he will have locked the door to the line in which he would desire to write the name of his candidate for one of the other offices of the three in that line; and on the other hand, if he should first open the door to cast his vote for his especial candidate, by writing the name of that candidate on the card, he would lock all the push-bars representing the other two by the operation of the door, 101. The slots, $h$, are of such circumferential extent, as seen in Fig. 37, that the tooth, 103ª, of the rack-bars, 103, while engaging the upper edge of the slot to roll or rock the tubes over to position for obstructing the corresponding fingers of the other push-bars, will not engage the opposite end of the slot to rock the tubes back when the bar is retracted. When, therefore, a voter has opened any given door, 101, he must cast his vote for all the offices covered by that door before closing it, or lose his vote as to the offices for which he does not thus cast it.

For the purpose of preventing the use of the push-bars of the series, 15, 16 or 17, in any instance in which the voter wishes to vote for an independent candidate in these groups respectively, by writing the name, or names, of his candidate or candidates on the card ballot, I provide upon each of the shafts, 25, 32 and 47, a segmental disk, $m$, having a straight edge, $n$, at one side, which is engaged by a tooth, $o$, projecting from the side of a thrust or push bar, 106, which extends through a slot in the plate, 11, past a curved cam extension or tail-piece, 101ª, projecting rigidly from the door, 101, which must be opened to disclose the portion of the card ballot on which the voter must write the name of his candidate for the particular office in question. The bar, 106, has a slot, 106ᶜ, so that beside its guidance in the slot through which it protrudes from the plate, 11, it is guided and supported on the shaft, which, as hereinafter explained, it is to lock. At the normal position of the parts,—that is, when ready for voting, and before a vote has been cast,—the door, 101, being closed, the thrust-bar, 106, stands with its tooth, $o$, immediately forward of and above the upper forward corner of the segment disk, that is, in position so that if the bar is thrust in, the tooth will pass in above the upper straight edge, $n$, of the disk and lock the shaft against rotation in the direction caused by the train-actuating push-bars; or so that if the shaft is first rocked in that direction the disk will be rocked up and bar the path of the tooth, $o$, inward. The cam-tail, 101ª, of the door operates to thrust the bar in when the door is opened, and thereby locks the shaft as described. In thus opening, the said cam-tail leaves the end of the thrust-bar flush with the outer surface of the plate, 11, so that it is inaccessible for manipulation. All the shafts of whichever series is under consideration,—25, 32, or 47,—being geared together, the actuation in the manner described, or any one of them by means of the tail, 101ª, operating on the thrust-bar, 106, will lock the entire series; and it is not necessary, therefore, to provide more than one of the shafts of each series with this device.

For the recording train I employ number wheels, 50, 51, 52, for units, tens and hundreds respectively, (a larger number being used if more than 999 votes are to be provided for). Each of these wheels has on its periphery digits from zero to nine inclusive, at intervals of thirty-six degrees, said digits being formed as type faces projecting from the periphery for the purpose of printing the record or tally sheet, as hereinafter explained. The three wheels, 50, 51 and 52, of each registering set are mounted on the sleeve, 53, with which the units wheel alone is rigid, the others being loose, and the sleeve being loose on the shaft or axle, 54, suitably supported in the frame, 55. Rigid with each of the number wheels, at what I call the initial side,—$i.\ e.$, the side toward the units wheel of the tens and hundreds wheels and on the corresponding side of the units wheel, there is a gear, 56, having ten teeth corresponding to the ten printing digits on the periphery of the wheel. On the other side of each number wheel there is rigid with the wheel a disk, 57, having each one notch, 58, in its periphery. On the shaft, 59, parallel with the shaft, 54, there is mounted loosely the gear, 60, which meshes with the gear, 56, of the units wheel. This gear, 60, has rigid with it a shouldered sleeve, 61, and on the reduced portion of this sleeve there are mounted two gear wheels, 62, and 63, like the gear wheel, 60, and adapted to mesh respectively with the gears, 56, of the tens and hundreds wheels; and on the side of these gears, toward the wheel, 60, there is rigid with each of them a disk, 64, which is of the nature of a gear and delay disk, having somewhat of both functions, as hereinafter explained. The gears, 60, 62 and 63, are spaced from each other by their hubs, 65, 65, and the correspondingly enlarged portion, 66, of the sleeve, 61, of the gear, 60, the spacing being such as to bring the gears into planes for meshing respectively with the gears, 56, as described. I have described the parts of these two shafts as loosely mounted, but they are so mounted as to tend to move together with certainty by their frictional engagement, when not restrained, or positively caused to move at different rates or in different directions. The periphery of the delay and gear disk, 64, is, as seen in Figs. 30 and 31, a succession of arcs concave outwardly; and the radius of curvature of these arcs and the radius of the circle in which they are located about the shaft, 59, is such that they coincide with and seat upon the periphery of the disk, 57, on the other shaft, and are thereby prevented from rotating with the preceding gear on the shaft, 59, except at the instant at which, by the rotation of the number wheel, the notch in the disk, 57, is brought around to one of the apexes or gear points between the said arcs. At this point, seen in Fig. 30, the disk, 64, is free to rotate by frictional engagement with the preceding gear and the sleeve of the first gear, 60, and the point thus enters the notch, as seen in Fig. 31. When thus entered, the rotation of the disk, 57, will positively rotate the disk, 64, until the point is carried out of the notch, whereupon the next succeeding concave arc seating upon the periphery of the disk, 57, again operates as a delay surface to lock the disk, 64, against rotation until another complete revolution of the disk, 57, has been made. This construction, it will be seen, results in a full rotation of the units wheel being made before any movement of the tens wheel occurs; and when the notch on the disk, 57, of the units wheel reaches a point in line with the axes of the two wheels, or a little before, or as seen in Fig. 30, the disk, 64, will be rotated one step, and the gear which is rigid therewith, meshing with the tens wheel, will carry the latter one step, and one step only, and halt it and lock it until another revolution of the units wheel has occurred. The same action will occur as between the tens wheel and the hundreds wheel, and so on, whatever number of wheels may be employed. The construction is the same in all the trains operated by the push-bars respectively, except that in the train for registering "straight ticket" votes the actuating finger, 88$^d$, being pivoted for retraction without retracting the train, a spring detent pawl, 88$^e$, is provided to prevent such retraction of the initial wheel, 50, of the train. The trains which correspond respectively to the push bars that coöperate with the telescoping tubes, as described, for preventing over-voting, being all those that relate to offices to which only one person is to be elected, are actuated by engagement of the teeth, $w$, on the push bars respectively, engaging the first gear wheels, 50, of the respective trains. In case of the other trains which must be adapted to derive from the push bars different degrees of movement, and in some instances, greater angular movement than could be communicated by a single tooth on the push bar, I prefer to use a frictional engagement, and for that purpose the initial wheel of the train has a shoulder against which the bar bears upwardly with sufficient pressure to effect a substantially positive engagement, and such engagement, I find, can be reliably obtained by employing suitable material for the wheel and shoulder respectively.

When the voter has cast his vote for all the candidates for whom he wishes to vote, either by means of the push-bars, or by writing their names on the card ballot behind the doors, 101, provision is necessary in the first place for restoring the parts of the machine which have been manipulated, to their normal position before the next voter presents himself, in order that the secrecy of the ballot may be preserved; and provision is necessary, in the next place, for releasing all the mechanisms so that the next voter can cast his vote; and this must not be done until the next voter has secluded himself in the booth by closing the door. Not to rely upon the caution or attention of the voter himself to insure the secrecy of his own ballot, the restoring of the push-bars to their normal position and discharging the card ballot, if it has been used, is made to depend upon the necessary action of the voter in leaving the booth, the means for this purpose being operated by the door which the voter must open to pass out. This door comprises, as already described, the lever arm, 10, of the rock-shaft, 132, which protrudes from the case, being journaled in the left-hand wall, and having inside the case the lever arm, 132$^a$, which has sliding pivotal connection with the lever, 133, fulcrumed at 133$^a$, and operatively connected at the lower end with the horizontal lever, 134, said last mentioned lever being fulcrumed at 134$^a$ on the bottom plate for operating the several resetting devices, as will be explained.

In order to restore to initial normal position the push-bars and the devices which are associated with them to prevent over-voting, without at the same time canceling or reversing the registration which has been made of the votes cast for the several candidates, the uprights, 20 and 21, which carry the telescoped tubes, 22, etc., and the shafts, 25, 30 and 47, are adapted to be lowered sufficiently to carry the several bars out of engagement with their respective registering trains before any reversing or restoring movement of the tubes and shafts and thereby of the bars, is performed. For this purpose there is provided a horizontal frame, 112, having rollers, 112$^a$, by which it is adapted to travel upon horizontal slide bearings, 113, supported on the case; and on this frame are cam-plates, 114, having the horizontal portions, 114$^a$ and 114$^b$, of its upper face connected by an inclined portion, 114$^b$, which operates as a wedge against the lowest shaft, 47, when the frame is moved horizontally forward to carry said cam-plates under said shaft by means hereinafter described, whereby the uprights, 20 and 21, and the entire system of tubes and shafts mounted therein are carried upward into position for engagement of the several push-bars with their registering trains, and by which, when the frame is pushed rearward, the uprights are caused to descend by gravity to the lower position at which said shaft rests on the lower horizontal portion, 114$^a$, of the cam-plates taking the bars out of engagement with their respective registering trains.

The frame, 112, is operated for the purpose of the movements indicated, by connections from the lever, 134, consisting of a lever, 115, fulcrumed at 115$^a$, on the bottom plate, and connected by a short link, 116, with said frame, 112, said lever, 115, being connected with the lever, 134, through the medium of a dog or latch, 117, which is pivoted to the lever, 134, at 117$^a$, and is held by the spring, 117$^b$, with its nose, 117$^c$, engaged with the lever, 115, as seen in Fig. 10, so that so long as such engagement continues said dog or latch operates as a part of the lever, 115, and causes the latter lever to operate as if pivoted directly to the lever, 134, at 117$^a$. The first movement which the lever, 134, receives from the lever, 133, as above described, by the rocking of said shaft, 132, when the voter opens the door to leave the booth, draws the frame 112, through the connections described rearward, thus letting down the uprights, 20 and 21, and disengaging the push-bars from their registering trains. This is accomplished by about the first one-third of the movement of the lever, 134. In the next one-third of its movement in the same direction the heel, 117$^b$, of the dog, 117, having encountered the stud, 119, which protrudes up from the bottom plate, is tripped out of engagement with the lever, 115, and said lever is prevented from further actuating the frame, 112, at this stage. The continued movement of the lever, 134, in the same direction, carries it under the inclined under side of the foot, 121ª, of the bar, 121, which is guided vertically on the upright, 20, and causes it to lift said bar. This bar extends up past all the shafts and tubes which are carried in the uprights, 20 and 21, and has devices for engaging said shafts and tubes when the bar is thrust upward for resetting them to normal position. This is done with respect to the tubes, 22, 22ª and 22ᵇ, by means of the fingers, 121ᶜ, projecting forward from the bar, 121, in position to engage in the slots, j, in all the tubes from innermost to outermost of all the series, the upper edge of said fingers being so shaped with respect to the edge of the slots in the three tubes that such upper movement and engagement rotates all the tubes backward far enough to carry the push-bars to normal position. For this purpose the tubes have to be rocked past their own normal position, and to restore them, the fingers, 121ᶜ, are sloped on the under edge so as to operate on the lower edge of the slots in the retraction of the bar, 121, and rock the tubes over to correct position. The tubes, 80, for the "Yes" and "No" voting have the circumferentially extended slots, 80ᵇ, and the bar, 121, has fingers, 121ᶜ, (see Fig. 15) which have their upper sloping edges adapted to engage the opposite ends of the slots, 80ᵇ, to rock the tubes, 80, in either direction back to normal position.

For the purpose of restoring the shafts of the several series, 25, 32, 147, corresponding to the push-bars, 15, 16, and 17, each of said shafts has in the fore-and-aft plane of the bar, 121, a segment ratchet disk, 122, having its periphery toothed through an arc equal to the maximum rotation which the shaft received in the voting operation; and this toothed portion is so situated that at normal position all the teeth are out of range of engagement with the toothed fingers or short racks, 121ᵈ, which protrude forward from the edge of the bar, 121; but to such extent as the shafts may be rotated in the voting and left standing in position corresponding to an indicated vote or votes, the teeth of the segments are brought into range for engagement with the racks respectively, and to that extent the upward thrusting movement of the bar, 121, engages and rotates them back to normal position, and in such action carries and leaves the last tooth clear of the points of the rack teeth; and for further security against retracting the segments and thereby the shafts in the descent of the bar, 121, the teeth of both the racks and the segments are formed ratchet-wise, with abrupt shoulders or faces in position to engage when the bar is thrust up, and inclined shoulders adapted to slip past each other on the opposite sides which would come into engagement during the descent of the bar. This action perfectly resets the push-bars, 15. The push-bars, 16 and 17, having associated with them the ladders described are also reset by means of a pin, v, on each of the segment disks, 33, which encounters the rear edge of the forked lever, 34, and rocks it back to upright position. In this action the dog, 35, being free from any pressure upon the periphery of the segment disk does not engage the latter, which rocks freely under the dog until the pin encounters the lever, 34. To fully restore the push-bars in view of the slight play of the pin, 37, in the slot, 38, reliance may be placed on the slant faces of the notches, 16ᶜ and 17ᶜ, lodged on the similar bottom edges of the slots in the plate, 11. The lowering of the push-bars at the rear end sets them oblique to the ladders enough to tilt up the tooth, 16ª and 17ª, out of the grooves of the bars, 41, so that the push-bars may return them to position with their said teeth in front of said ladder bars. For returning the ladder, 40, one of the shafts, 32, has fingers, 32ª, which encounter the oblique faces of the cam projection, 42ª, on the side bars of the ladder, and crowd it back as said shafts come to normal position. For returning the ladder, 71, the eccentric edge, 70ᶜ, of the cam disks, 70, operates on the projection, 72, of the ladder with like effect.

If the card ballot has been used by the voter, the opening of any one of the doors, 101, by thrusting back the rack-bars 103, or thrust-bar, 106, as described, will, by means of the finger, q, on said bar, engaging the slot, k, in the vertical tube, 123, rock the tube about its axis. At the lower end of the tube there is a lever arm or finger, 123ª, which engages the forward end of a lever, 124, which at the rear end protrudes under the lever arm, 105, and which has on its under side a wedge-shaped cam block, 105ª, along whose under inclined face said rear end of the lever, 124, swings in the movement described, and thereby the said lever arm, 105, is sprung at the left-hand end, and a button, 105ᵇ, which it carries is thrust up through the enlargement at 134ᶜ, in the slot, 134ᵇ, of the lever, 134, and thereby the lever arm, 105, is engaged with the lever, 134. Said lever arm, 105, is rigid with a vertical rock-shaft, 135, journaled in the top and bottom plates, and provided also with two lever arms, 136, at top and bottom respectively, (of which only the lower one is shown) which are connected by corresponding links, 137, (of which only the lower one is shown) with the apertured plate or gridiron, 94, at the top and bottom of the latter. This gridiron is rabbeted on its inner face to afford a lodgment of depth equal to the thickness of one of the card ballots, and is guided so as to slide to the right from the position at which it holds the cards exposed for voting. From this system of connections it will be seen that if the card ballot has been used and thereby the lever arm, 105, has become connected with the lever, 134, the opening movement of the booth door will cause the gridiron to be moved in its slide bearings to carry the card lodged in its rabbet out from the position for voting, into the open receptacle, 110, at the right-hand end of the machine. Springs, 111, 111, attached to the forward wall of this receptacle are put under slight tension by the sliding of the gridiron past them, and react from such tension through the apertures of the gridiron when the latter has carried the card fully into the receptacle, and thus dislodged the card, leaving the gridiron free to return empty and receive the next card ballot in its rabbet.

All the above described operations of the card ballot mechanism are performed during the portion of the movement of the lever, 134, which disengages the push-bars from the registering train, and resets the twelve shafts and push-bars, as described. This occupies about two-thirds of the movement of that lever which is caused by the opening of the booth door; and by the time these several operations are completed the lever, 134, encounters the finger, 115$^b$, of the lever, 115, such encounter occurring at the opposite side of the fulcrum of the lever, 134, from that at which the dog, 117, is connected to it; and the continuing movement of the lever, 134, in the same direction as before reverses the movement of the frame, 112, causing the cam plates, 114, by their inclines, 114$^c$, to wedge upward the uprights, 20 and 21, and restore the push-bars to engagement with the registering trains. During this portion of the movement of the lever, 134, it encounters a lever arm, 123$^b$, with which the tube, 123, is provided in the horizontal plane of said lever, 134, and completes the restoration of that tube to normal position, and locks it in that position. It will be seen, however, that the movement of the bar, 121, which is caused by the opening of the booth door, beside restoring to normal position all the push-bars which may have been manipulated by the departing voter and their coöperating tubes, shafts and ladders, will also, by means of the tubes engaging the fingers, 103$^a$, of the rack-bars, 103, and by means of the tubes, 123, engaging the fingers, Q, of the rack-bars, 103, and thrust-bars, 106, restore the said rack-bars to—or nearly to normal position, and close, or nearly close the doors, 101, and the provision of the lever arm, 123$^b$, is a further precaution for completing this action, and chiefly for locking the doors, 101, closed. The rack-bars in their retraction also withdraw the wedge or cam block, 105$^a$, from the position at which it operated to hold the button, 105$^b$, in the aperture, 134$^c$, and thereby the lever, 105, is left free for disengagement from the lever, 134, as soon as the movement of that lever back to normal position slides the button along the slot, 134$^b$, to the enlargement, 134$^c$. But this opening movement of the door does not leave the machine in condition for the next voter, because all the tubes and shafts, 25, 30 and 47, are locked by the bar, 121, engaged with their resetting features respectively, as described; and because, furthermore, as to the card ballot, the doors, 101, cannot be opened for voting upon it. Also the locking of the tubes and shafts by holding the push-bars prevents any manipulation of the registering trains because they are engaged with the push-bars. But when the next voter enters and closes the booth door behind him, the shaft, 132, being rocked in the opposite direction from that caused by the opening of the door, by withdrawing the lever, 134, from under the inclined foot of the bar, 121, permits that bar to drop out of locking engagement with the tubes, and by the connections above described cause the lever, 134, to thrust the gridiron, 94, back into position at the front of the magazine of blank card ballots, where it receives the foremost of such ballots in its rabbet ready to be voted upon; and the lever arm, 123$^b$, is at the same time released from the obstruction of the lever, 134, so that the doors, 101, can be opened for using the card ballot.

The platen, 55, through which the number wheels protrude for printing has a spring press gripper, 55$^a$, at the top for holding the tally sheet while printing or taking off a proof of the vote indicated by the trains. In practice it is designed that such proof shall be taken at the commencement of the election before any vote has been cast, to show how the trains stand, so that if they have been manipulated and do not show zero, as they should, proper correction can be made by deduction from the registration at the closing of the polls. The tally sheet having received the first proof will be moved down the width of a line of numbers to receive the final imprint, and the first figure standing below the last will be subtracted therefrom to ascertain the true vote registered.

The doors, 101, are made of open-work so that they will at all times, even before they are opened, clearly disclose the card ballot within, but not in such manner that a vote can be written on the ballot. They also have apertures which expose the titles of the offices which are to be voted on the different portions of the ballot behind the several doors respectively, so that the voter can distinctly understand from the appearance, not only that there is a card ballot for such voting, but also which door should be opened in order to vote upon a particular office. This detail structure of the door is shown clearly in Fig. 38.

I do not limit myself to the use of telescoping tubular shafts, as a means for controlling the operation for preventing over-voting, of push-bars corresponding to a plurality of candidates for each of a plurality of offices, all arranged in one line, whether row or column; but any arrangement of a plurality of shafts in position to be operated by push-bars all in one line, so that the push-bars by their construction relatively to the shafts respectively select the proper shafts and do not actuate any other shaft of the set or series, will be within the scope of this feature of my invention. Specifically, the construction which involves the conaxial and thereby necessarily telescoped shafts, presents advantages by reason of which it is claimed specifically.

In the use of the term, "push-bars," to describe the elements which are exposed for actuation by the voter, I do not intend to exclude the bars which might be operated by pulling instead of pushing; nor, except in certain specific relations in which such push-bars are described specifically, do I design by the use of this term to limit myself to elements having strictly longitudinal movement; and for avoidance of such apparent limitation, I employ in my claims the term, "keys", to denote these parts in some instances, especially when their particular character as having longitudinal movement, or their form as being bars is not necessarily involved. In referring to these bars as exposed for actuation, I do not limit myself strictly to visibility of a portion of such bars, nor exclude the employment of an intermediate element to receive the direct pressure of the voter for actuation.

For convenience and uniformity in the interpretation of the following claims, it should be observed that throughout the specification and claims, the word "indicate" and its derivatives is urged in a generic sense as including either temporary or permanent indication of the vote or votes cast by means of the mechanisms described; the word "register" and its derivatives being used to express a temporary or progressive indication of such votes, and the word "record" and its derivatives being used to express a permanent or final indication of such votes.

I claim:—

1. In a voting machine, in combination with mechanisms for recording the votes cast upon a plurality of offices or propositions and for a plurality of candidates for said offices respectively, the several mechanisms for indicating the votes upon all mutually exclusive propositions and candidates being in rows in one direction, and the mechanisms for indicating votes for candidates and propositions not mutually exclusive being in rows in transverse direction; and means for operating all the mechanisms in said transverse rows in groups or sub-divisions, by one continuous operation acting upon such groups successively.

2. In a voting machine, mechanisms for indicating the votes cast for a plurality of candidates for the same office, comprising push-bars corresponding to the candidates respectively; registering trains operated by said push-bars respectively; a shaft extending transversely with respect to the push-bars, and means on the shaft for engagement by the push-bars respectively to rock the shaft, said means being adapted, when the shaft is rocked without a given push-bar, to obstruct the operation of such push-bar.

3. In a voting machine, mechanisms for indicating the votes cast for a plurality of candidates for the same office, comprising a plurality of push-bars corresponding to the candidates respectively; a like plurality of registering trains actuated by the push-bars respectively, the several bars being in a row; a shaft crossing all the push-bars of such row; means by which the actuation of any push-bar in direction to actuate its registering train rocks the shaft, and means by which the rocking of the shaft locks all the other push-bars against actuation.

4. In a voting machine, mechanisms for indicating the votes cast for a plurality of candidates for the same office, comprising an inclosing case; push-bars protruding from the case corresponding to the candidates respectively; registering trains actuated by the push-bars respectively; a tube or hollow shaft journaled transversely to the push-bars, the latter having operating fingers, and the tube having transverse slots in the paths of movement of said fingers respectively, said tube or hollow shaft being normally in position to have its slots entered by the fingers and to be rocked by their engagement with the remote end of the slot, said slots being only of sufficient amplitude to admit the fingers before the shafts are rocked, whereby the rocking of the shaft by any one push-bar carries the slots corresponding to the other push-bars out of position to be entered by the other fingers respectively, and the operation of the said other push-bars is obstructed.

5. In a voting machine, in combination with an inclosing case, mechanisms for indicating the votes cast for a plurality of candidates for each of a plurality of offices of a group, said mechanisms comprising push-bars protruding from the case, corresponding to the several candidates, said push-bars being in groups corresponding to the several groups of offices, one push-bar for each office in the group; registering trains actuated by the push-bars respectively; a plurality of telescoped tubes extending transversely to the bars, corresponding in number to the number of offices in the groups, said tubes being journaled for operation as independently rotatable shafts, and having transverse slots in the planes of the push-bars respectively, the slots in the several tubes except one at each plane, being of such amplitude with respect to the thrust of the bars, as not to afford engagement for the latter, whereby each bar of any group rocks only one of the tubes, each tube being slotted for actuation by some one bar of the group.

6. In a voting machine, in combination with an inclosing case, mechanisms for indicating the votes cast for a plurality of candidates for each of a plurality of offices of a group, comprising a push-bar for each candidate for each office; registering trains operated by the push-bars respectively; telescoped tubes corresponding in number with the number of offices in the group extending transversely to the push-bars, each tube having a transverse slot in position for engagement by the push-bars corresponding to the several candidates for one office of the group, and adapted to be rocked by engagement of the push-bar with such slot when the bar is pushed in for operating its registering train, said slots being of such amplitude that the rocking of the tube by any one bar carries the slots for the other bars out of position for engagement and obstructs the operation of such other bars, all the tubes except one at the plane of any push-bar having their slots of such amplitude as not to be engaged by the push-bar at that plane.

7. In a voting machine, mechanisms for indicating the votes cast upon mutually exclusive propositions, comprising push-bars corresponding to the propositions respectively, and registering trains which the bars respectively actuate; a tube or hollow shaft extending transversely to the bars and having slots for engagement; devices on the bars for engaging said slots respectively, the slots and engaging devices being relatively formed for encounter of the latter with the former at one side of the axis when the tubes are in normal position, and at the other side when the tube has been rocked away from normal position by such encounter, whereby the pushing in of either bar after the other has been pushed in to rock the tube, rocks the tube back and retracts the first actuated bar.

8. In a voting machine, in combination with an inclosing case, a plurality of mechanisms for indicating the votes for a plurality of candidates for each of a plurality of offices, said mechanisms comprising each a push-bar exposed outside the case for actuation; a registering train within the case engaged and operated by the push-bar when it is thrust in, the push-bars and their trains for the different candidates for the same offices respectively being in horizontal rows, and those for the candidates of the same groups or parties respectively being in vertical columns; means by which the operation of the push-bar for any candidate locks the push-bar for all other candidates for the same office; a vertically-operating plate which engages all the bars of each column, and a push-bar and connections for operating such plate to thrust in all the bars of the column simultaneously.

9. In a voting machine having push-bars for the several candidates for the different offices arranged with those for the candidates of the several parties respectively in columns; a vertically operated plate having cam slopes for engaging the several push-bars to thrust them in when the plate is moved vertically; a push-bar and connections for so moving the plate, said cam slopes on the plate being subdivided into groups in which the intervals between successive slopes is greater than the distance between the push-bars; whereby the movement of the plate brings the cam slopes into engagement with the push-bars one slope in each group at a time only, successive slopes of the several groups coming into engagement with their bars successively as the plate continues to move.

10. In a voting machine, in combination with an inclosing case, mechanisms for indicating the votes cast for a plurality of candidates for each of a plurality of offices, the devices for operating said mechanisms being arranged in columns comprising each a group of candidates not mutually exclusive—as a party ticket; means for operating simultaneously by one action all said mechanisms of any column; registering trains connected with said means respectively for indicating the vote by such groups or parties, said means for the several groups being arranged in a horizontal row; a shaft extending across such row, and means by which the operation of any one of said party vote mechanisms rocks the shaft, and means by which the rocking of the shaft locks the other party vote mechanisms against actuation.

11. In a voting machine, in combination with an inclosing case, mechanisms for indicating the votes cast for the candidates for a plurality of similar offices in which a like plurality of candidates are to be elected, comprising push-bars, one for each candidate; registering trains actuated by the push-bars respectively, said push-bars being arranged in columns and rows, the number in each column corresponding to the total number of persons which may be elected to said similar offices, and the number in each row corresponding to the number of groups of candidates for said offices; shafts extending transversely to said push-bars in said several rows respectively; means by which said shafts are geared together to rotate all in the same direction whenever one of them is rotated; means by which the push-bars engage the shafts respectively, all the push-bars of each row engaging the same shaft, and means on the shafts by which their rotation to the extent caused by the successive engagement of as many push-bars as there are persons to be elected to the same office, locks the remaining push-bars against actuation.

12. In a voting machine, in combination with an inclosing case, push-bars corresponding to the entire number of candidates for a plurality of offices of the same name to which a plurality of persons may be elected, said push-bars being arranged in rows and columns, the number in each column being the number of persons who can be elected to the office, and the number in each row corresponding to the groups of candidates for such offices; registering trains actuated by the push-bars respectively; shafts extending transversely to the push-bars; ratchet disks on the shafts and means on the push-bars for engaging the ratchet disks respectively, said shafts being all geared together for rotation equally in the same direction whenever one shaft is rotated, and hoods secured to the shafts to be rocked therewith, adjusted thereon for interposition in the path of the ratchet-engaging means of the push-bars after the shaft is rocked by as many ratchet teeth as the number of persons who can be elected to such office.

13. In a voting machine, means for indicating the votes to be cast for the candidates for an office to which more than one person may be elected, comprising push-bars and registering trains actuated by them respectively, said push-bars being arranged in as many rows as the number of persons who can be elected to the office; shafts extending across said rows respectively, all said shafts being geared together for rotation equally in the same direction whenever one shaft is rotated; ratchet disks on the shafts respectively, and means on the bars for engaging the disks when the bars are thrust in; means by which the rotation of the disks presents obstruction to the thrust and engagement of the bars when the shafts have been rocked through an angle corresponding to as many ratchet teeth as the number of persons who can be elected to the office.

14. In a voting machine, mechanisms for indicating the votes cast for a plurality of candidates for an office to which a plurality of persons may be elected, and for which the voter is entitled to vote cumulatively, comprising push-bars corresponding to the several candidates, arranged in as many rows as the number of persons who may be so elected; shafts extending transversely to said rows; gears on said shafts respectively and intermediate gears connecting them, whereby said shafts are all rotated in the same direction; clutching devices by which the push-bars engage and rock the shafts when the push-bars are pushed in; registering trains engaged by the push-bars respectively; cams carried by said intermediate gears and thereby rocked in the opposite direction from the shafts; a frame having bars extending transversely to the push-bars and adapted to be engaged by the push-bars when the latter are thrust in for rocking the shafts, and projections from such frame in the planes of the cams, encountered by the latter for thrusting back the frame to retract the push-bars previously actuated.

15. In a voting machine, mechanisms for indicating the votes cast for a plurality of candidates for offices to which a plurality of persons may be elected, and for distributing the vote to all the candidates voted for, according to any prescribed law, comprising push-bars, one for each candidate; registering trains engaged by the push-bars respectively, said push-bars being arranged in columns corresponding to the several party tickets, and in rows as many as the maximum number of candidates named by any party; shafts extending transversely to the push-bars along the rows respectively; clutching devices by which the push-bars when thrust in to operate the registering trains rock the shafts a distance corresponding to such thrust; gears on the several shafts and intermediate gears connecting them, whereby all the shafts are rocked in the same direction whenever one shaft is rocked; frames having bars extending transversely to the push-bars along the rows respectively; grooves for engagement with the push-bars, said bars having teeth adapted for such engagement; cams rotated by the intermediate gears in the reverse direction of the shafts; projections from said frames engaged by the cams, said cams being shaped to force back the frame and thereby retract the bars engaged therewith to reduce the registration made by the bars when thrust in, at any prescribed rate or according to any prescribed law.

16. In a voting machine, mechanisms for indicating the votes cast for a plurality of candidates for offices to which a plurality of persons may be elected, and for distributing the vote to all the candidates voted for, according to any prescribed law, comprising push-bars, one for each candidate; registering trains engaged by the push-bars respectively, said push-bars being arranged in columns corresponding to the several party tickets, and in rows as many as the maximum number of candidates named by any party; shafts extending transversely to the push-bars along the rows respectively; clutching devices by which the push-bars when thrust in to operate the registering trains rock the shafts a distance corresponding to such thrust; gears on the several shafts, and intermediate gears connecting them, whereby all the shafts are rocked in the same direction whenever one shaft is rocked; frames having bars extending transversely to the push-bars along the rows respectively provided with grooves for engagement with the push-bars, said push-bars having teeth adapted for such engagement; lever fingers carried by the intermediate gears, and rocked in the reverse direction from the shafts; cam projections extending from the frames in the path of said fingers, said fingers and cam projections being relatively shaped at their encountering edges to cause such reverse rocking of the fingers to thrust back the frame upon each rocking of the shafts after the first to reduce the registration in proportion to the number of push-bars actuated, and means for stopping the fingers on the frame after as many such actuations as the number of persons who can be elected to such office.

17. In a voting machine, in combination with a case, mechanism for indicating the votes cast, comprising push-bars exposed outside the case for actuation by the voter, and registering trains within the case actuated by the push-bars respectively; means for preventing excessive voting, comprising shafts extended transversely to the push-bars; means by which the push-bars engage and rock the shafts while actuating the registering trains; means by which such rocking of the shafts locks the push-bars which are not thus pushed in to rock the shafts, the push-bars being guided loosely in the case and supported by the shafts respectively; uprights in which the shafts are all mounted; means by which the uprights are supported and adapted to be raised and lowered for taking the push-bars into and out of engagement with their trains, and connections for operating said raising and lowering means comprising a part extended outside the case for actuation by the voter.

18. In a voting machine, in combination with a case, mechanism for indicating the votes cast, comprising push-bars corresponding to the several candidates to be voted for, and registering trains actuated by the push-bars respectively; shafts extended transversely to the push-bars, and means by which the push-bars rock the shafts while actuating the registering trains, and are adapted to be thrust back by the reverse rocking of such shafts respectively, the push-bars being supported by the shafts in engagement with their respective trains; uprights in which the shafts are mounted; a horizontally movable frame on which the uprights are supported having slopes by which the uprights are raised and lowered as said frame moves horizontally, and lever connections for operating said frame extended outside the case for actuation.

19. In a voting machine, in combination with an inclosing case, mechanism for indicating the votes cast, comprising push-bars and registering trains which they respectively actuate; means for preventing over-voting, comprising shafts extending transversely to the push-bars; means by which the push-bars rock the shafts while actuating their trains, and means for thrusting back the push-bars by reversely rocking the shafts, the push-bars being upheld by the shafts in engagement with their trains; uprights in which the shafts are mounted, adapted to be raised and lowered to carry the push-bars into and out of such engagement; means for so raising and lowering the uprights comprising a horizontal frame and connections by which it raises and lowers the uprights by reciprocating horizontal movement; a vertically guided bar and coöperating means on the bar and shafts for engagement in direction to reverse the shafts when the bar is elevated; a horizontally swinging lever, 134, and connections therefrom to the horizontally movable frame, comprising the lever, 115, the trip latch for connecting it with the lever, 134, means for tripping the latch during the movement of the lever for sliding the frame in direction for lowering the uprights, and means by which the lever, 134, engages the lever, 105, at the opposite side of the fulcrum of the former to reverse the movement of the horizontal frame during the same movement of the lever, 134, and means by which the lever, 134, in said movement, but in the interval between the opposite movements of the frame, lifts the vertically guided bar; whereby movement of the lever, 134, in one direction disengages the push-bars from the trains, reverses the shafts and restores the push-bars and reëngages them with said trains.

20. In a voting machine, mechanisms for indicating the votes cast, comprising push-bars and registering trains which they respectively actuate; shafts extended transversely to the push-bars and supporting the same in engagement with their respective trains; uprights which carry the shafts, the horizontally movable frame which upholds the uprights having means for lifting and lowering it by the reciprocation of said frame; means for retracting the push-bars; a lever fulcrumed on the case, and connections by which it actuates the horizontally movable frame to and fro in one movement of said lever, and means by which said lever, in the interval of said two movements of the frame, actuates the push-bar-retracting devices.

21. In a voting machine, mechanism for indicating the votes cast, comprising push-bars and registering trains which they respectively actuate; shafts extending transversely to the push-bars and supporting the same in engagement with their respective trains; means by which the push-bars rock the shafts while actuating their trains, and means by which the reverse rocking of the shafts retracts the push-bars; uprights which carry the shafts, and coöperating devices thereon and on the shafts for reversely rocking the shafts when said vertically guided bar is thrust in one direction; a horizontally movable frame which upholds the uprights having means for lifting and lowering it by the reciprocation of said frame; a lever fulcrumed on the case, and connections by which, by its own movement in one direction, it reciprocates the frame, and means by which, in the same movement, in the interval between the two movements of the frame, it thrusts the vertically guided bar in direction for reversely rocking the shafts.

22. In a voting machine, mechanism for indicating the votes cast, comprising push-bars and registering trains which they respectively actuate; shafts extending transversely to the push-bars and supporting the same in engagement with their respective trains; means by which the push-bars rock the shafts while actuating their trains, and means by which the reverse rocking of the shafts retracts the push-bars; uprights which carry the shafts; a horizontally movable frame which upholds the uprights, having means for lifting and lowering it by the reciprocation of same frame; a lever fulcrumed on the case, and means extending outside the case for operating it; a second lever fulcrumed on the case, and a latch by which it is disengageably connected to the first lever; a link connecting the latch to the horizontally movable frame; means for tripping the latch as the lever swings in one direction to disengage it, said first lever having an abutment at the opposite side of its fulcrum from the latch connection which encounters the second lever after the latch is tripped, whereby during the same movement of the first lever it reverses the movement of the second lever and of the frame; a vertically guided bar and coöperating parts on said bar and on the shafts respectively for reversely rocking the shafts when the bar is thrust upward, said vertically guided bar having an oblique foot-piece or finger under which the first mentioned lever extends and which is encountered by said lever in the interval between the two movements communicated by the latter to the horizontally sliding frame, whereby the movement of said lever in one direction first disengages the push-bars from their trains, then causes the push-bars to be retracted, and finally engages them with their respective trains.

23. In a voting machine, mechanisms for indicating independently the votes cast for a plurality of offices or propositions, said mechanisms comprising each a push-bar exposed for actuation by the voter, and a registering train actuated thereby; a card-ballot and doors which are swung open to expose separately a plurality of portions thereof for writing votes thereon for the several offices or propositions; shafts extending transversely to the push-bars; means on the shafts for engagement by the push-bars respectively to rock the shafts; push-bars operated by the opening movement of the doors, and means on them respectively to rock the shafts, said means in both cases being adapted, when the shaft is rocked without a given push-bar, to obstruct the operation of such push-bar, whereby the use of either of said means for recording the vote prevents the use of the other means.

24. In a voting machine, in combination with an inclosing case, a plurality of mechanisms for indicating the votes for a plurality of candidates for each of a plurality of offices, said mechanisms comprising each a push-bar exposed outside the case for actuation; a registering train within the case engaged and operated by the push-bar when it is thrust in, the push-bars and their trains for the different candidates for the same offices respectively being in rows in one direction, and those for the candidates of the same groups respectively being in rows in the transverse direction; plates extending past all the bars of said transverse rows respectively and adapted each to engage all the bars of its row for operating them in direction to cause them to actuate their respective registering trains; a push-bar for each such plate, and connections by which it operates the plate to thrust in all the bars of the transverse rows by one action; a tube or hollow shaft extending transversely to said plate-operating push-bars having transverse slots, and the said bars having fingers in the plane of said slots respectively adapted to enter the same to rock the shaft by engagement with the remote ends of the slots, the slots being of only sufficient amplitude to admit the fingers before the shafts are rocked, whereby the rocking of the shaft by any one of said plate-operating push-bars prevents the operation of any other of said push-bars.

25. In a voting machine, in combination with a group or set of vote-registering mechanisms, keys for actuating such mechanisms respectively; cams for limiting the movement of, and for retracting the keys; a train in which said cams are operated, each of said keys having connections for operating such train, and an element for connecting the keys, adapted to become engaged with them upon their actuation respectively for registration, said connecting element having means for encountering and being acted upon by the cams.

26. In a voting machine, in combination with a group or set of vote-registering mechanisms, keys for actuating such mechanisms respectively; a connecting element with which said keys respectively become engaged when actuated for registration; cams and a train in which they are operated, each of the keys having connections for operating such train when it is itself actuated for registration, said connecting element having means for encountering the cams when moved by engagement with the keys, said cams being adapted, upon rotation after such encounter, to retract said element and the keys engaged therewith.

27. In a voting machine, in combination with a group or set of vote-registering mechanisms, keys for actuating such mechanisms respectively; rotatable cams actuated by the keys, the means for communicating such movement from the keys to the cams comprising a train in which the cams are operated and with which the keys have operating connection, said connection being adapted for operating the train only upon the vote-registering movement of the keys respectively; an element for connecting the keys adapted to be engaged by them respectively upon a predetermined registering movement thereof, said connecting element being provided with means for encountering the cams, the cams being adapted, upon rotation after said encounter, to retract said element and the keys engaged therewith.

28. In a voting machine, in combination with a group or set of vote-registering mechanisms, keys for operating said mechanisms respectively; a rotatable cam and a gear train by which it is operated, said train comprising shafts and connections by which each key in its vote-registering movement rocks one of such shafts for actuating the train, and thereby rotates the cam; an element with which all the keys become engaged upon a predetermined minimum vote-registering movement, said element being movable by the keys when thus engaged, and provided with means encountering the cam for limiting the movement of said element, the cam being adapted, upon further rotation after such encounter, to retract said element and the keys engaged therewith.

29. In combination with a group or set of vote-registering mechanisms, keys adapted to actuate said mechanisms respectively; a series of shafts corresponding to the keys, and means by which the keys rock the shaft in their vote-registering movement, said shafts being geared together for rotation all in the same direction; a frame having a bar extending cross-wise of the keys and adapted to be engaged thereby upon a predetermined vote-registering movement of the keys; a plurality of cams actuated by said train, said frame being provided with means encountering said cams for arresting its movement derived from the keys, the cams being adapted, upon rotation after such encounter, to retract said frame and the keys engaged therewith.

30. In a voting machine, in combination with a group of registering mechanisms, keys for actuating such trains respectively; a cam and a series of shafts corresponding respectively to the keys, geared together for rotating such cam whenever any one of the shafts is rotated; connections from said keys to said shafts respectively for rotating the latter; a connecting element adapted for engagement of said keys respectively upon predetermined minimum movement thereof, said element being provided with means for encountering said cam, and the cam being adapted upon rotation after such encounter to retract said element and the parts engaged therewith; the cam having an abrupt shoulder whose encounter with said elements arrests the rotary movement of the cam.

31. In a voting machine, in combination with a group or set of vote-registering mechanisms, keys for operating said mechanisms respectively; shafts corresponding to said keys respectively, and connections by which the registering movement of the keys rocks the shaft; a gear train connecting said shafts for rotation all in the same direction, comprising gears intermediate the shafts respectively; a cam carried by certain of said intermediate gears, thereby rotated in opposite direction from the shafts; an element for connecting said keys adapted to be engaged with the keys respectively upon a predetermined minimum vote-registering movement of the latter, said connecting element being provided with means encountering the cams, said encountering means and said cams being relatively formed to cause the rotation of the cams after such encounter to retract said element and the keys engaged thereby in varying degree for equal successive angular movements of the cams.

32. In a voting machine, in combination with a group or set of vote-registering mechanisms, keys for operating said mechanisms respectively; shafts corresponding to said keys respectively, and connections by which the registering movement of the keys rocks the shaft; trains connecting said shafts for rotation all in the same direction, comprising gears intermediate the shafts respectively; a cam carried by certain of said intermediate gears and thereby rotated in opposite direction from the shafts; an element for connecting said keys adapted to be engaged with the keys respectively upon a predetermined vote-registering movement of the latter, said connecting element being provided with means encountering the cams, said encountering means and said cams being relatively formed to cause the rotation of the cams after such encounter to retract said element and the keys engaged thereby in varying degree for equal successive angular movements of the cams; one or more of said intermediate gears having a locking arm which is brought in locking position by predetermined maximum rotation of the train.

33. In a voting machine, in combination with a group or set of registering mechanisms, keys adapted to actuate said mechanisms respectively; a series of shafts corresponding to the keys geared together for rotation all in the same direction; cams rotated by one or more of the intermediate gears connecting said shafts; a frame for connecting the keys adapted to be engaged with said bars respectively upon a predetermined minimum vote registering movement of the keys, said frame being provided with means for encountering the cams after said cams have been rotated by a predetermined number of repetitions of said minimum movements, said cams and the encountering means being relatively formed to cause retraction of the frame by movement subsequent to such encounter in a degree varying by a predetermined law according to the number of such subsequent actuations.

34. In a voting machine, in combination with a group or set of vote-registering mechanisms, manually operated keys for actuating said mechanisms respectively, arranged in rows and columns; a series of shafts, each corresponding to a row of the keys, said shafts being geared together at both ends for rotation all in the same direction; means by which each key rotates the shaft corresponding to the row in which such key is located, whereby each key when actuated rotates the entire series of shafts; a frame having means for engagement with all of the keys and adapted to be engaged by any one of them upon a predetermined minimum vote-registering movement of the key; cams actuated in the gear trains connecting said shafts at corresponding positions at opposite ends, said frame being provided with means encountering said cams, the cams being adapted upon rotation after such encounter to retract the frame and the keys engaged therewith.

35. In a voting machine, in combination with a group or set of vote-registering mechanisms, manually operated keys for actuating said mechanisms respectively, arranged in rows and columns; a series of shafts each corresponding to a row of the keys, said shafts being geared together at both ends for rotation all in the same direction; means by which each key rotates the shaft corresponding to the row in which such key is located, whereby each key when actuated rotates the entire series of shafts; a frame having means for engagement with all of the keys and adapted to be engaged by any one of them upon a predetermined minimum vote-registering movement of the key; a plurality of cams at each end of said series of shafts, said frame being provided with means encountering said cams, the cams being adapted upon rotation after such encounter to retract the frame and the keys engaged therewith.

36. In a voting machine in combination with a group of vote-registering mechanisms, keys for actuating said mechanisms respectively, said keys being arranged in rows and columns; shafts corresponding to each row geared together for rotation all in the same direction; clutching devices by which the keys are engaged with the shafts respectively for rotating the latter upon movement of the keys in one direction only; the cams, 70, rotated in the trains connecting said shafts; the frame, 71, having means for engagement by the keys respectively after predetermined minimum movement of the latter and means for encounter with said cams, the cams being adapted in shape to permit a predetermined movement of the frame before obstructing the same by such encounter, and to retract the frame by movement after such encounter, and provided with an abrupt shoulder, $70^d$, to finally arrest further movement of the parts.

37. In a voting machine, in combination with a group or set of vote-registering mechanisms, manually operated keys for actuating said mechanisms respectively; shafts connected with the keys respectively for rotation in one direction only, said shafts being geared together for rotation all in the same direction; an element for connecting the keys adapted for engagement with the keys respectively after predetermined minimum movement of the latter; lever fingers, 45, rotated in the train which connects said shafts in opposite direction from the shafts, the element for engaging the keys having the cams, 46, for encountering and coöperating with said fingers, said parts, 45 and 46, being relatively formed to cause the rotation of the fingers after encounter with the cams to retract the element which connects the keys in different degrees for equal angular movements of the fingers according to a predetermined law.

38. In a voting machine, in combination with a group or set of vote-registering mechanisms, manually operated keys for actuating such mechanisms respectively, such keys being arranged in rows and columns; shafts corresponding to the rows respectively; means by which the keys in the several rows are engaged with the corresponding shafts for rocking them in one direction only, said shafts being all geared together for rocking or rotation in the same direction; lever fingers which are rocked in the train with said shafts and gears; an element for connecting all the keys adapted to be engaged by said keys respectively upon their actuation to a predetermined extent; cam projections on said connecting element in the planes of movement of said lever fingers, adapted for encounter therewith after a predetermined movement of said connecting element and resultant rocking of the shafts of said train, said lever fingers and cam projections being relatively shaped at their encountering parts to retract said connecting element and the keys engaged therewith in varying degree for equal successive angular movements of said fingers according to any prescribed rule for the proportionate reduction of the votes registered by such keys respectively.

39. In a voting machine, in combination with a group or set of vote-registering mechanisms, keys for actuating said mechanisms respectively arranged in rows and columns; shafts corresponding to the rows respectively, each key being provided with connections for rocking the shaft corresponding to the row to which it pertains, when the key is operated for actuating its registering train, said shafts being geared together for rotation all in the same direction; an element for connecting the keys for moving them together, adapted to be engaged by the keys when they are respectively actuated for registration; lever fingers rocked in the train which connects said shafts, said connecting element having cam projections in the planes of movement of the lever fingers respectively for encounter therewith, said lever fingers and cam projections being shaped to coöperate for limiting the movement of said connecting element and for retracting it upon further rocking of the shaft after such encounter, said fingers each extending past the next adjacent shaft and being stopped thereby for limiting such retracting movement.

40. In a voting machine, in combination with keys arranged to be operated at will and vote-registering mechanisms adapted to be actuated by said keys respectively, the keys being arranged in vertical groups or columns corresponding to all the offices, and in rows corresponding to all the names for each office, vertically operated plates at each column having cam slopes for engaging the several keys of the column to actuate them for registration when the plate is moved vertically; keys and connections for so moving said plates respectively; a tubular shaft extending transversely with respect to said last mentioned keys, said shaft having in line with each of said keys a transverse slot, and each of said keys having a dog adapted to enter the slot for rocking the shaft upon the registering movement of the key, said slots being of such length that by such rocking movement they are carried out of range of the dogs respectively, whereby the shaft when thus rocked by any one key opposes an unbroken surface to the corresponding dog and obstructs the action of the corresponding key.

41. In a voting machine, in combination with an inclosing case, mechanism for registering the votes cast for a plurality of candidates for each of a plurality of offices, the devices for operating said mechanism being arranged in columns comprising each a group of candidates not mutually exclusive—as a party ticket; means for operating, by one action, all said mechanisms of any column, said means for the several groups being arranged in a horizontal row; a tubular shaft extending across such row having slots in the path of movement of said operating means respectively for engagement of said means therewith to rock the shaft, said slots being of such limited extent that the rocking of the shaft by any one of said means carries the remainder of the slots out of the path of their respective operating means and causes said shaft to present an unbroken surface in said path, whereby the subsequent operation of any other of said operating means is prevented.

42. In a voting machine, mechanism for registering the votes cast for a plurality of candidates respectively; vote-registering trains operated by said keys respectively; a tubular shaft extending transversely with respect to the keys, and slots in such shaft for engagement by the keys respectively to rock such shaft, said slots being of such short length that the rocking of the shaft by any one key carries the slots pertaining to other keys out of range thereof, and causes the shaft to oppose an unbroken surface to such keys for preventing their actuation.

43. In a voting machine, mechanisms for indicating independently the votes cast for a plurality of offices or propositions, said mechanisms comprising each an operating part exposed for actuation by the voter, and a registering train actuated by said operating part for registration of the vote; a card ballot and means for exposing separately a plurality of portions thereof for writing votes thereon for the several offices or propositions respectively, and connections from the respective registering-train-operating parts to the respective ballot-exposing means for locking the latter to prevent such exposure by the actuation of the former for registration.

44. In a voting machine, mechanisms for indicating independently the votes cast for a plurality of offices or propositions, comprising each an operating part exposed for actuation by the voter, and a registering train actuated by such operating part for registration of the vote; a card ballot and independently operatable means for exposing separate portions thereof corresponding to the several registering-train-operating parts respectively, and connections by which the movement of said card-ballot-exposing means respectively locks the corresponding train-operating parts against actuation.

45. In a voting machine, mechanism for indicating the votes to be cast, comprising, in combination with an inclosing case, mechanically operated registering trains and exteriorly accessible means for actuating them; a magazine of card-ballots contained within the case, the case having apertures through which the forward card-ballot may be exposed; a door which is opened to expose the card-ballot; a carrier adapted to engage the foremost card thus exposed and withdraw it within the case from exposed position; lever connections from said carrier for so operating it; mechanism comprising parts accessible exteriorly for actuation for restoring to normal position the actuating parts for the mechanically operated registering trains; devices for connecting said restoring means with the levers which operate the card-ballot-carrier, and connections operated by said door in opening for operating said devices to effect such connection, whereby the card-ballot is withdrawn only in cases in which the door has been opened to expose it.

46. In a voting machine, a series of push-pins, a rocker-bar in the path of all of said pins, and adapted to be rocked when either of them is pushed in, to a position which prevents the others from being likewise operated, and a register for each push-pin and adapted to be operated each time the companion push-pins are pushed in.

In testimony whereof, I have hereunto set my hand in the presence of two witnesses, at Chicago, Illinois, this 5th day of June, A. D., 1903.

JOHN W. NUNAMAKER.

In the presence of—
FRED G. FISCHER,
JULIA S. ABBOTT.